US009064281B2

(12) United States Patent
Ballard et al.

(10) Patent No.: US 9,064,281 B2
(45) Date of Patent: Jun. 23, 2015

(54) MULTI-PANEL USER INTERFACE

(71) Applicant: C-SAM, Inc., Oakbrook Terrace, IL (US)

(72) Inventors: Barbara Elaine Ballard, Chicago, IL (US); Raghu Bharathur, Mount Prospect, IL (US); Nehal Maniar, Oak Brook, IL (US)

(73) Assignee: MasterCard Mobile Transactions Solutions, Inc., Purchase, NY (US)

( * ) Notice: Subject to any disclaimer, the term of this patent is extended or adjusted under 35 U.S.C. 154(b) by 332 days.

(21) Appl. No.: 13/776,388

(22) Filed: Feb. 25, 2013

(65) Prior Publication Data

US 2013/0268400 A1 Oct. 10, 2013

Related U.S. Application Data

(63) Continuation-in-part of application No. 13/651,028, filed on Oct. 12, 2012, now abandoned.

(60) Provisional application No. 61/654,124, filed on Jun. 1, 2012, provisional application No. 61/546,084, filed on Oct. 12, 2011, provisional application No. 61/619,751, filed on Apr. 3, 2012.

(51) Int. Cl.
*G06Q 30/00* (2012.01)
*G06F 3/0481* (2013.01)
*G06Q 30/06* (2012.01)
*G06Q 20/36* (2012.01)

(52) U.S. Cl.
CPC ............ *G06Q 30/0641* (2013.01); *G06Q 20/36* (2013.01); *G06F 3/0481* (2013.01); *G06F 3/04817* (2013.01)

(58) Field of Classification Search
CPC .............. G06Q 30/0641; G06F 3/0481; G06F 3/04817
USPC ......... 705/27.1; 715/240, 788, 764, 781, 864, 715/798
See application file for complete search history.

(56) References Cited

U.S. PATENT DOCUMENTS 4,227,253 A 10/1980 Ehrsam et al.
4,238,854 A 12/1980 Ehrsam et al.
(Continued)

FOREIGN PATENT DOCUMENTS

WO 0152212 A1 7/2001
WO 2006074258 A2 7/2006
(Continued)

OTHER PUBLICATIONS

Baudisch et al., "Collapse-to-Zoom: Viewing Web Pages on Small Screen Devices by Interactively Removing Irrelevant Content," UIST '04 Proceedings of the 17th Annual ACM Symposium on User Interface Software and Technology, p. 91-94, ACM, New York, 2004.*
(Continued)

*Primary Examiner* — Amee A Shah
(74) *Attorney, Agent, or Firm* — GTC Law Group LLP & Affiliates

(57) ABSTRACT

A multi-panel user interface includes one-tap access of a shopping-related function from a collapsed panel in an expandable panel user shopping interface without requiring expanding the collapsed panel.

19 Claims, 13 Drawing Sheets

(56) References Cited

U.S. PATENT DOCUMENTS

| | | |
|---|---|---|
| 4,302,810 A | 11/1981 | Bouricius et al. |
| 5,276,311 A | 1/1994 | Hennige |
| 5,578,808 A | 11/1996 | Taylor |
| 5,590,038 A | 12/1996 | Pitroda |
| 5,794,207 A | 8/1998 | Walker et al. |
| 5,815,657 A | 9/1998 | Williams et al. |
| 5,855,008 A | 12/1998 | Goldhaber et al. |
| 5,859,419 A | 1/1999 | Wynn |
| 5,864,667 A | 1/1999 | Barkan |
| 5,910,987 A | 6/1999 | Ginter et al. |
| 5,943,423 A | 8/1999 | Muftic |
| 5,955,961 A | 9/1999 | Wallerstein |
| 5,974,396 A | 10/1999 | Anderson et al. |
| 5,979,797 A | 11/1999 | Castellano |
| 6,016,476 A | 1/2000 | Maes et al. |
| 6,078,888 A | 6/2000 | Johnson, Jr. |
| 6,085,976 A | 7/2000 | Sehr |
| 6,142,368 A | 11/2000 | Mullins et al. |
| 6,142,369 A | 11/2000 | Jonstromer |
| 6,145,739 A | 11/2000 | Bertina et al. |
| 6,149,055 A | 11/2000 | Gatto |
| 6,233,341 B1 | 5/2001 | Riggins |
| 6,250,557 B1 | 6/2001 | Forslund et al. |
| 6,418,326 B1 | 7/2002 | Heinonen et al. |
| 6,442,532 B1 | 8/2002 | Kawan |
| 6,505,773 B1 | 1/2003 | Palmer et al. |
| 6,510,236 B1 | 1/2003 | Crane et al. |
| 6,577,861 B2 | 6/2003 | Ogasawara |
| 6,611,869 B1 | 8/2003 | Eschelbeck et al. |
| 6,622,015 B1 | 9/2003 | Himmel et al. |
| 6,732,919 B2 | 5/2004 | Macklin et al. |
| 6,738,749 B1 | 5/2004 | Chasko |
| 6,745,326 B1 | 6/2004 | Wary |
| 6,761,319 B2 | 7/2004 | Peachman et al. |
| 6,789,193 B1 | 9/2004 | Heiden |
| 6,885,877 B1 | 4/2005 | Ozaki et al. |
| 6,948,063 B1 | 9/2005 | Ganesan et al. |
| 6,999,943 B1 | 2/2006 | Johnson et al. |
| 7,010,582 B1 | 3/2006 | Cheng et al. |
| 7,039,802 B1 | 5/2006 | Eskicioglu et al. |
| 7,158,948 B1 | 1/2007 | Rodriguez et al. |
| 7,167,711 B1 | 1/2007 | Dennis |
| 7,200,578 B2 | 4/2007 | Paltenghe et al. |
| 7,216,091 B1 | 5/2007 | Blandina et al. |
| 7,287,271 B1 | 10/2007 | Riggins |
| 7,373,515 B2 | 5/2008 | Owen et al. |
| 7,379,913 B2 | 5/2008 | Steele et al. |
| 7,516,103 B1 | 4/2009 | Peitrucha, Jr. et al. |
| 7,590,570 B2 | 9/2009 | Harrison et al. |
| 7,630,986 B1 | 12/2009 | Kannan et al. |
| 7,822,635 B1 | 10/2010 | Brown et al. |
| 7,827,057 B1 | 11/2010 | Walker et al. |
| 7,844,500 B2 | 11/2010 | Ran |
| 7,925,878 B2 | 4/2011 | Merrien et al. |
| 7,970,690 B2 | 6/2011 | Diana et al. |
| 8,055,548 B2 | 11/2011 | Staib et al. |
| 8,056,014 B2 * | 11/2011 | Brockway et al. ............ 715/788 |
| 2001/0018746 A1 | 8/2001 | Lin |
| 2001/0034604 A1 | 10/2001 | Yagasaki et al. |
| 2001/0034720 A1 | 10/2001 | Armes |
| 2001/0037294 A1 | 11/2001 | Freishtat et al. |
| 2001/0037451 A1 | 11/2001 | Bhagavatula et al. |
| 2001/0045451 A1 | 11/2001 | Tan et al. |
| 2002/0023010 A1 | 2/2002 | Rittmaster et al. |
| 2002/0026582 A1 | 2/2002 | Futamura |
| 2002/0052825 A1 | 5/2002 | Bensemana |
| 2002/0062249 A1 | 5/2002 | Iannacci |
| 2002/0077964 A1 | 6/2002 | Brody et al. |
| 2002/0087388 A1 | 7/2002 | Keil et al. |
| 2002/0095331 A1 | 7/2002 | Osman et al. |
| 2002/0107730 A1 | 8/2002 | Bernstein |
| 2002/0108041 A1 | 8/2002 | Watanabe et al. |
| 2002/0111907 A1 | 8/2002 | Ling |
| 2002/0138455 A1 | 9/2002 | Abdel-Moneim et al. |
| 2002/0147920 A1 | 10/2002 | Mauro |
| 2002/0169626 A1 | 11/2002 | Walker et al. |
| 2002/0169737 A1 | 11/2002 | Armstrong et al. |
| 2002/0177433 A1 | 11/2002 | Bravo et al. |
| 2003/0023880 A1 | 1/2003 | Edwards et al. |
| 2003/0028451 A1 | 2/2003 | Ananian |
| 2003/0028470 A1 | 2/2003 | Dutta |
| 2003/0038707 A1 | 2/2003 | Geller |
| 2003/0074253 A1 | 4/2003 | Scheuring et al. |
| 2003/0078788 A1 | 4/2003 | Sussman et al. |
| 2003/0084302 A1 | 5/2003 | De Jong et al. |
| 2003/0093414 A1 | 5/2003 | Litzow et al. |
| 2003/0105722 A1 | 6/2003 | Welt |
| 2003/0115126 A1 | 6/2003 | Pitroda |
| 2003/0154135 A1 | 8/2003 | Covington et al. |
| 2003/0163700 A1 | 8/2003 | Paatero |
| 2003/0204725 A1 | 10/2003 | Itoi et al. |
| 2004/0002878 A1 | 1/2004 | Maria Hinton |
| 2004/0029569 A1 | 2/2004 | Khan et al. |
| 2004/0030887 A1 | 2/2004 | Harrisville-Wolff et al. |
| 2004/0039651 A1 | 2/2004 | Grunzig et al. |
| 2004/0044627 A1 | 3/2004 | Russell et al. |
| 2004/0181665 A1 | 9/2004 | Houser |
| 2004/0187018 A1 | 9/2004 | Owen et al. |
| 2004/0210597 A1 | 10/2004 | Wanish |
| 2004/0254881 A1 | 12/2004 | Kumar et al. |
| 2004/0268127 A1 | 12/2004 | Sahota |
| 2005/0021488 A1 | 1/2005 | Agrawal et al. |
| 2005/0022136 A1 * | 1/2005 | Hatscher et al. ............. 715/798 |
| 2005/0055275 A1 | 3/2005 | Newman et al. |
| 2005/0081044 A1 | 4/2005 | Giles et al. |
| 2005/0228874 A1 | 10/2005 | Edgett et al. |
| 2005/0235220 A1 * | 10/2005 | Duperrouzel et al. ........ 715/788 |
| 2005/0261959 A1 | 11/2005 | Moyer |
| 2006/0015358 A1 | 1/2006 | Chua |
| 2006/0059344 A1 | 3/2006 | Mononen |
| 2006/0069585 A1 | 3/2006 | Springfield et al. |
| 2006/0069916 A1 | 3/2006 | Jenisch et al. |
| 2006/0080545 A1 | 4/2006 | Bagley |
| 2006/0129454 A1 | 6/2006 | Moon et al. |
| 2006/0262929 A1 | 11/2006 | Vatanen et al. |
| 2007/0079333 A1 | 4/2007 | Murakami et al. |
| 2007/0083441 A1 | 4/2007 | Harper et al. |
| 2007/0130252 A1 | 6/2007 | Boyle |
| 2007/0130463 A1 | 6/2007 | Law et al. |
| 2007/0136800 A1 | 6/2007 | Chan et al. |
| 2007/0198432 A1 | 8/2007 | Pitroda et al. |
| 2007/0214037 A1 | 9/2007 | Shubert et al. |
| 2007/0239476 A1 | 10/2007 | Rohan et al. |
| 2008/0015942 A1 | 1/2008 | Harper et al. |
| 2008/0033869 A1 | 2/2008 | Steele et al. |
| 2008/0059297 A1 | 3/2008 | Vallier et al. |
| 2008/0059375 A1 | 3/2008 | Abifaker |
| 2008/0137861 A1 | 6/2008 | Lindmo et al. |
| 2008/0313079 A1 | 12/2008 | Van Bosch et al. |
| 2009/0254971 A1 | 10/2009 | Herz et al. |
| 2009/0271317 A1 | 10/2009 | Walker et al. |
| 2009/0307300 A1 | 12/2009 | Guedalia et al. |
| 2010/0269096 A1 | 10/2010 | Araya et al. |
| 2011/0251870 A1 | 10/2011 | Tavares et al. |
| 2011/0321127 A1 | 12/2011 | Pitroda et al. |
| 2012/0005077 A1 | 1/2012 | Pitroda et al. |
| 2012/0005078 A1 | 1/2012 | Pitroda et al. |
| 2012/0005079 A1 | 1/2012 | Pitroda et al. |
| 2012/0005080 A1 | 1/2012 | Pitroda et al. |
| 2012/0005081 A1 | 1/2012 | Pitroda et al. |
| 2012/0005082 A1 | 1/2012 | Pitroda et al. |
| 2012/0005083 A1 | 1/2012 | Pitroda et al. |
| 2012/0005084 A1 | 1/2012 | Pitroda et al. |
| 2012/0005085 A1 | 1/2012 | Pitroda et al. |
| 2012/0005086 A1 | 1/2012 | Pitroda et al. |
| 2012/0005087 A1 | 1/2012 | Pitroda et al. |
| 2012/0005088 A1 | 1/2012 | Pitroda et al. |
| 2012/0005089 A1 | 1/2012 | Pitroda et al. |
| 2012/0005090 A1 | 1/2012 | Pitroda et al. |
| 2012/0005091 A1 | 1/2012 | Pitroda et al. |
| 2012/0005092 A1 | 1/2012 | Pitroda et al. |
| 2012/0005725 A1 | 1/2012 | Pitroda et al. |
| 2012/0005726 A1 | 1/2012 | Pitroda et al. |
| 2012/0011058 A1 | 1/2012 | Pitroda et al. |

(56) References Cited

U.S. PATENT DOCUMENTS

| | | | |
|---|---|---|---|
| 2012/0101831 A1 | 4/2012 | Pitroda et al. | |
| 2012/0101832 A1 | 4/2012 | Pitroda et al. | |
| 2012/0101833 A1 | 4/2012 | Pitroda et al. | |
| 2012/0101834 A1 | 4/2012 | Pitroda et al. | |
| 2012/0101835 A1 | 4/2012 | Pitroda et al. | |
| 2012/0101836 A1 | 4/2012 | Pitroda et al. | |
| 2012/0109667 A1 | 5/2012 | Pitroda et al. | |
| 2012/0109668 A1 | 5/2012 | Pitroda et al. | |
| 2012/0109669 A1 | 5/2012 | Pitroda et al. | |
| 2012/0109670 A1 | 5/2012 | Pitroda et al. | |
| 2012/0109671 A1 | 5/2012 | Pitroda et al. | |
| 2012/0109672 A1 | 5/2012 | Pitroda et al. | |
| 2012/0109673 A1 | 5/2012 | Pitroda et al. | |
| 2012/0109674 A1 | 5/2012 | Pitroda et al. | |
| 2012/0116790 A1 | 5/2012 | Pitroda et al. | |
| 2012/0116959 A1 | 5/2012 | Pitroda et al. | |
| 2012/0136756 A1* | 5/2012 | Jitkoff et al. | 705/27.1 |
| 2013/0141308 A1* | 6/2013 | Huang et al. | 345/2.1 |
| 2013/0215155 A1* | 8/2013 | Pasceri et al. | 345/684 |
| 2013/0268837 A1* | 10/2013 | Braithwaite et al. | 715/234 |

FOREIGN PATENT DOCUMENTS

| | | | |
|---|---|---|---|
| WO | 2006075917 | A2 | 7/2006 |
| WO | 2007044500 | A2 | 4/2007 |
| WO | 2007044500 | A3 | 6/2007 |

OTHER PUBLICATIONS

Derfler et al., "How Networks Work", Bestseller Edition, Ziff-Davis Press, Emeryville, CA, 1996, 69 pages.

European Application Serial No. EP06836203.7, Supplementary European Search Report mailed on Aug. 31, 2010, 5 pages.

Gralla, Preston, "How the Internet Works", Millennium Edition, Que Corporation, Indianapolis, IN, 1999, 35 pages.

Muller, Nathan J., "Desktop Encyclopedia of the Internet", Artech House Inc., Norwood, MA, 1999, 51 pages.

International Application Serial No. PCT/US2006/039091, International Preliminary Report on Patentability issued on Mar. 17, 2009, 4 pages.

International Application Serial No. PCT/US2006/039091, International Search Report and Written Opinion mailed on Jun. 26, 2008, 4 pages.

International Application Serial No. PCT/US2012/060038, International Search Report and Written Opinion mailed Mar. 28, 2013, 7 pages.

White, Ron, "How Computers Work", Millennium Edition, Que Corporation, Indianapolis, IN, 1999, 83 pages.

White, Ron, "How Software Works", Ziff-Davis Press, 1993, 194 pages.

* cited by examiner

| PANEL | ICON | SHOPPING FUNCTION | COLLAPSED PANEL STATE | META DATA |
|---|---|---|---|---|
| SHOP | MAG GLASS | SEARCH | COLLAPSED | USER PREFERENCES |
| PAY | CREDIT CARD | WALLET TRANSACTION | COLLAPSED | USER AUTHEN CREDENTIALS |
| SHOP | QR CODE | SCAN ITEM | COLLAPSED | DISPLAY SCAN IN EXPANDED PANEL |
| MORE | LIST | PRESENT MORE OPTIONS | EXPANDED | USER SERVICE LEVEL |

FIG. 13

MULTI-PANEL USER INTERFACE

CROSS-REFERENCE TO RELATED APPLICATIONS

This application claims the benefit of U.S. provisional patent application Ser. No. 61/654,124 filed Jun. 1, 2012, which is hereby incorporated by reference in its entirety.

This application is a continuation-in-part of U.S. patent application Ser. No. 13/651,028 filed Oct. 12, 2012. U.S. patent application Ser. No. 13/651,028, which claims the benefit of U.S. provisional patent application 61/546,084 filed Oct. 12, 2011 and U.S. provisional patent application 61/619,751 filed Apr. 3, 2012.

This application is related to the following U.S. patent applications: U.S. patent application Ser. No. 11/539,024, filed Oct. 5, 2006, entitled "Transactional Services", presently pending; U.S. patent application Ser. No. 11/931,872, filed Oct. 31, 2007, entitled "System and methods for servicing electronic transactions", presently pending; and U.S. patent application Ser. No. 10/284,676, filed Oct. 31, 2002, entitled "System and methods for servicing electronic transactions", also presently are pending.

Each of the foregoing applications is incorporated herein by reference in its entirety.

This application is related to the following U.S. patents, each of which is incorporated herein by reference in its entirety: U.S. Pat. No. 6,769,607, filed Jun. 6, 2000, entitled "Point of sale and display adapter for electronic transaction device"; U.S. Pat. No. 6,705,520, filed Nov. 15, 1999, entitled "Point of sale adapter for electronic transaction device"; U.S. Pat. No. 5,590,038, filed Jun. 20, 1994, entitled "Universal electronic transaction card including receipt storage and system and methods of conducting electronic transactions"; U.S. Pat. No. 5,884,271, filed Sep. 6, 1996, entitled "Device, system and methods of conducting paperless transactions device", U.S. Pat. No. 6,925,439, filed Mar. 10, 1999, entitled "Device, system and methods of conducting paperless transactions"; U.S. Pat. No. 7,308,426, filed Aug. 11, 1999, entitled "System and methods for servicing electronic transactions"; and U.S. Pat. No. 7,366,990, filed Jan. 19, 2001, entitled "Method and system for managing user activities and information using a customized computer interface".

BACKGROUND

1. Field of the Invention

The methods and systems described herein generally relate to electronic display-based user interface functionality and particularly relate to accessing shopping related functions through a multi-panel shopping user interface.

2. Description of the Related Art

Multi-panel user interfaces typically provide access to panel-related functions by selecting a collapsed panel to expose such functions in an expanded view of the selected panel. However, many such functions need not require expanding a collapsed panel to properly function; yet due to user interface limitations, such functions are neither accessible, nor operational without first being exposed in an expanded panel.

SUMMARY

As described and depicted in figures herein, methods and systems of a user interface as may include an active content item (e.g. an icon, and the like) disposed on a collapsed panel of a multi-panel collapsible panel user interface on a mobile device. The collapsible panel user interface may have a plurality of collapsed panels and an expanded panel. An active content item on the collapsed panel can be selected (e.g. tapped by the user on the personal mobile device touch screen) and a shopping related function may be executed without causing the collapsed panel to expand. This capability may allow the collapsed panel to remain collapsed while a program function that is accessed by the icon of the collapsed panel executes (e.g. in the background). The icon may cause functions such as accessing a mobile wallet to perform a purchase transaction, and the like. Another function that may be accessed from a collapsed panel could be a camera function that may cause a display of an item in the field of view of the camera, such as for scanning a barcode to identify products, determine its purchase price, and the like. Each of the collapsed panels or only one of the collapsed panels or any number of the collapsed panels may display active content, such as one or more active content icons.

In addition to the multi-panel collapsible panel user interface methods and systems described herein, combinations of such functionality with other functionality described herein and in related patent applications referenced and incorporated herein may provide additional functionality and capability. In particular, the active content item-based multi-panel collapsible panel user interface may be combined with mobile wallet capabilities and other ecosystem capabilities described herein and in U.S. patent application Ser. No. 13/651,028, the entirety of which is herein incorporated. Such combinations may facilitate access to and execution of mobile wallet and/or eco system functionality via an active content item disposed on a collapsed panel without requiring expanding the collapsed panel. In addition, the active content item-based multi-panel collapsible panel user interface may be combined with various proximity related network access granting functionality as described in U.S. provisional patent application Ser. No. 61/654,124. Such combinations may facilitate conducting transactions over a wireless network (e.g. Bluetooth, Wi-Fi, and the like) via an active content item that is disposed on a collapsed panel without requiring expanding the panel, wherein access to the network is achieved via a proximity action, such as near-field communication "tap-and-pair", recognition of a multi-dimensional code (e.g. viewing a QR code with a camera of a personal mobile device), and the like.

In addition to a multi-panel user interface with predefined icons, icons may be dynamically disposed on collapsed panels based on processing of a shopping-related function. This capability may further enhance the utility of the multi-panel based user interface that ensures that collapsed panels remain collapsed when certain shopping functions that are accessed through icons disposed on the collapsed panels do not require expanding the panel. Some shopping-related functions may require additional user input that may be provided via a dynamically placed icon.

The methods and systems of a multi-panel user interface described herein includes one-tap access of a shopping-related function from a collapsed panel in an expandable panel user shopping interface without requiring expanding the collapsed panel.

The methods and systems of a multi-panel user interface described herein includes a method of accessing one of a plurality of shopping related functions via a multi-panel user interface including displaying a single expanded panel of a multi-panel user shopping interface on an electronic display of a computing device; displaying a plurality of collapsed panels of the multi-panel user shopping interface on the electronic display, wherein at least one of the plurality of collapsed panels includes an icon to facilitate performing a shopping-related function; and receiving an indication of a user selection of the icon and in response thereto: determining with the computing device a shopping-related function from the plurality of shopping-related functions based on an association of the icon and the shopping-related function; and causing execution of program steps by the computing device that perform the determined shopping-related function while permitting the collapsed panel that includes the icon to remain collapsed.

This method further including permitting the single expanded panel to remain expanded and the plurality of collapsed panels to remain collapsed during the execution of the program steps. In the method, the indication of a user selection of the icon comprises an indication that the user selected the icon by single-tapping the icon in a touch sensitive electronic display. In this method the at least one of the plurality of collapsed panels includes a plurality of icons to facilitate accessing different shopping-related functions without requiring expansion of the collapsed panel.

In the method, the program steps are adapted to cause a display generated by the shopping-related function to supplant a portion of the multi-panel user shopping interface on the electronic display. In this method the supplanted portion is at least one of the single expanded, the single expanded panel and a portion of the plurality of collapsed panels, and the single expanded panel and all of the plurality of collapsed panels.

In the method the computing device is a mobile user device. Also in the method the user shopping interface further comprises an icon disposed on single expanded panel for accessing a shopping-related function. Further in the method, at least two of the plurality of collapsed panels include at least one icon for facilitating one-tap access to distinct shopping-related functions. Alternatively in the method, the plurality of shopping-related functions includes one or more of accessing vouchers, accessing shopping lists, performing payments, presenting loyalty cards, and redeeming coupons. In this method, determining a shopping-related function includes using data associated with the icon to access a dataset of shopping-related functions.

The methods and systems of a multi-panel user interface described herein includes a user shopping interface that provides access to a plurality of shopping-related functions via active icons disposed on a collapsed panel of the user shopping interface without requiring expanding the panel.

The methods and systems of a multi-panel user interface described herein includes a personal mobile electronic device comprising a display on which a user shopping interface configured to provide access to a plurality of shopping related functions is presented, wherein the user shopping interface comprises one or more collapsed panels; and a portion of the one or more collapsed panels including one or more icons that are configured to cause the mobile electronic device to perform program steps that provide access to a portion of the plurality of shopping related functions in response to selection of the one or more icons without requiring expanding any of the one or more collapsed panels.

The methods and systems of a multi-panel user interface described herein includes a multi-panel user shopping interface comprising at least one expanded panel and a plurality of collapsed panels, that provides access to one of a plurality of shopping-related functions via active icons disposed on a portion of the plurality of collapsed panels without requiring expanding any of the plurality of collapsed panels.

The methods and systems of a multi-panel user interface described herein includes a multi-panel user interface, including a single expanded panel disposed on an electronic display of a computing device; a plurality of collapsed panels disposed substantially aligned with the single expanded panel on the electronic display, wherein a first region of the plurality of collapsed panels is adapted to cause a collapsed panel to expand and the expanded panel to collapse in response to a user selection of the first region; an icon disposed on one of the collapsed panels, wherein the icon is associated with a shopping related function; a data set of shopping related functions that facilitates associating the icon with a shopping related function; and a set of computer instructions for causing the computing device to execute a shopping related function that is associated with the icon without causing the one of the collapsed panels to expand in response to a user selection of the icon.

The methods and systems of a multi-panel user interface described herein includes one-tap [purchasing of]/[adding to a shopping cart] an item that is in proximity to a portable shopping device via active content disposed on a collapsed panel of a stacked expandable panel user shopping interface.

The methods and systems of a multi-panel user interface described herein includes a method including receiving an indication of a user selection of an icon disposed on a collapsed panel of a multi-panel user interface that is displayed on an electronic display of a computing device; activating a camera function of the computing device without requiring the collapsed panel to be expanded; presenting an image of a field of view of the camera in a portion of the electronic display; analyzing with the computing device the image to determine a data value associated with a visual code detected in the image, and associating a purchasable product with the visual code; transmitting at least the data value over a network to a server; receiving from the server in response a purchase price for the purchasable product; and presenting at least the purchase price of the purchasable product in the portion of the electronic display. This method may further include presenting a purchase action button in the portion of the electronic display along with the purchase price. In this method, the portion of the electronic display comprises an expanded panel of the multi-panel user interface. In this method, activating a camera function is based on an association of the icon with a shopping function that accesses a camera function of the computing device. Alternatively, in this method the multi-panel user interface comprises a single expanded panel and a plurality of collapsed panels. This method may further include presenting an icon in the collapsed panel on the electronic display for facilitating purchasing the purchasable product, such as by adding the product to a virtual shopping cart without requiring the collapsed panel to expand.

The methods and systems of a multi-panel user interface described herein includes performing an electronic transaction via an electronic wallet function of a mobile device in response to user selection of an icon disposed on a collapsed panel of a multi-panel user shopping interface without expanding the collapsed panel.

The methods and systems of a multi-panel user interface described herein includes a method comprising: receiving an indication of a user selection of an icon disposed on a collapsed panel of a multi-panel user interface that is displayed on an electronic display of a personal mobile device; determining an action type associated with the selected icon via a collapsible panel interface application executing on the mobile device; determining with the mobile device a shopping-related function associated with the selected icon by accessing a data table that cross references icons with shopping-related functions; forwarding the action type to a mobile transaction processing platform of the mobile device, wherein a mobile transaction process communicates via an application programming interface layer with a wallet access widget to access a mobile wallet payment resource of the mobile device; and performing the shopping-related function via the mobile transaction processing platform with a mobile wallet payment resource determined based on the action type, wherein the collapsed panel remains collapsed through performance of the shopping-related function. In this method, performing the shopping-related function includes executing a wallet companion applet on the mobile device for accessing the payment resource of the mobile wallet.

The methods and systems of a multi-panel user interface described herein includes a mobile shopping facility that includes a mobile wallet capability operable on a mobile device and a plurality of collapsed panels depicted in a shopping interface of the mobile device, wherein at least one of the plurality of collapsed panels includes a shopping-related function icon that is accessible to a user of the mobile device while the at least one panel is collapsed, and that when activated causes the shopping-related function to interact with the mobile wallet capability to facilitate performing the shopping-related function while the at least one of the plurality of collapsed panels remains collapsed.

The methods and systems of a multi-panel user interface described herein includes a system includes an icon disposed on a collapsed panel of a multi-panel user interface that is displayed on an electronic display of a personal mobile device, wherein the collapsed panel remains collapsed in response to a user selection of the icon; an action type association facility for determining an action type for a selected icon by forwarding selected icon information to the association facility executing on the mobile device; a data table that facilitates cross referencing an icon with a shopping-related function; a mobile transaction processing platform of the mobile device, wherein a mobile transaction process communicates via an application programming interface layer with a wallet access widget to access a mobile wallet payment resource of the mobile device; and a collapsible panel interface application for receiving an indication of a selected icon, determining the shopping-related function, and forwarding the action type and shopping-related function information to the mobile transaction processing platform to perform the shopping-related function with a mobile wallet payment resource determined based on the action type, wherein the collapsed panel remains collapsed through performance of the shopping-related function.

The methods and systems of a multi-panel user interface described herein includes a mobile device user interface of a multi-tiered secure electronic transaction ecosystem platform comprising active content on at least one of a plurality of collapsed panels, the active content for performing personalized secure transactions via a mobile wallet capability of the mobile device while a panel on which the active content is disposed remains collapsed The methods and systems of a multi-panel user interface described herein includes a system including an icon disposed on a collapsed panel of a multi-panel user interface that is displayed on an electronic display of a personal mobile device, wherein the collapsed panel remains collapsed in response to a user selection of the icon; an ecosystem for performing secure personalized transactions between the mobile device and an ecosystem participant via a mobile transaction process server; a mobile transaction processing platform of the mobile device, wherein the mobile transaction processing platform facilitates performing the secure personalized transactions over the ecosystem; and a collapsible panel interface application for receiving an indication of a selected icon, determining an electronic transaction associated with the icon, and forwarding information regarding the determined electronic transaction to the mobile transaction processing platform to conduct the transaction over the ecosystem, wherein the collapsed panel remains collapsed throughout conducting the transaction over the ecosystem.

The methods and systems of a multi-panel user interface described herein includes a multi-panel based user shopping interface that facilitates performing shopping-related functions over a wireless network to which access is acquired via a tap-and-pair NFC function of a mobile device operating the user shopping interface, wherein the user shopping interface includes at least one active content item disposed on a collapsed panel of the multi-panel based user shopping interface, the active content for causing a shopping-related function to be performed via the mobile device over the network while the collapsed panel remains collapsed.

The methods and systems of a multi-panel user interface described herein includes a method of network-based electronic transaction processing via a multi-panel based user shopping interface including receiving an indication of a user selection of an icon disposed on a collapsed panel of a multi-panel user interface displayed on an electronic display of a mobile device, wherein the mobile device is configured to access a wireless network based on network configuration information received by the device during a near-field communication transaction conducted with the device; determining with the mobile device a shopping-related function associated with the selected icon by accessing a data table that cross references icons with shopping-related functions; and performing the shopping-related function by communicating over the wireless network, wherein the mobile device display depicts the panel on which the icon is disposed as collapsed throughout the performance of the shopping-related function.

The methods and systems of a multi-panel user interface described herein includes a multi-panel based user shopping interface that facilitates performing shopping-related functions over a wireless network to which access is acquired via a visual code scan operation of a mobile device operating the user shopping interface, wherein the user shopping interface includes at least one active content item disposed on a collapsed panel of the multi-panel based user shopping interface, the active content for causing a shopping-related function to be performed via the mobile device over the network while the collapsed panel remains collapsed.

The methods and systems of a multi-panel user interface described herein includes a method of network-based electronic transaction processing via a multi-panel based user shopping interface including receiving an indication of a user selection of an icon disposed on a collapsed panel of a multi-panel user interface displayed on an electronic display of a mobile device, wherein the mobile device is configured to access a wireless network based on network configuration information derived by the device from a visual code captured by a camera function of the mobile device; determining with the mobile device a shopping-related function associated with the selected icon by accessing a data table that cross references icons with shopping-related functions; and performing the shopping-related function by communicating over the wireless network, wherein the mobile device display depicts the panel on which the icon is disposed as collapsed throughout the performance of the shopping-related function.

The methods and systems of a multi-panel user interface described herein includes a multi-panel based user shopping interface that facilitates performing shopping-related functions over a wireless network to which access is acquired via a tap-and-pair NFC function of a mobile device operating the user shopping interface, wherein the user shopping interface includes at least one active content item disposed on a collapsed panel of the multi-panel based user shopping interface, the active content for causing a shopping-related function to be configured to be performed via the mobile device over the network while the collapsed panel remains collapsed.

A The methods and systems of a multi-panel user interface described herein includes a method of network-based electronic transaction processing via a multi-panel based user shopping interface including receiving an indication of a user selection of an icon disposed on a collapsed panel of a multi-panel user interface displayed on an electronic display of a mobile device, wherein the mobile device is configured to access a wireless network based on network configuration information received by the device during a near-field communication transaction conducted with the device; determining with the mobile device a shopping-related function associated with the selected icon by accessing a data table that cross references icons with shopping-related functions; and configuring the shopping-related function to communicate over the wireless network, wherein the mobile device display depicts the panel on which the icon is disposed as collapsed throughout the performance of the shopping-related function.

The methods and systems of a multi-panel user interface described herein includes a mobile device-based multi-panel user shopping interface that includes at least one active content item disposed on a collapsed panel of the multi-panel based user shopping interface, the active content item for confirming access to a wireless network for which the mobile device configured as a result of a tap-and-pair nfc action while the collapsed panel remains collapsed.

The methods and systems of a multi-panel user interface described herein includes a method of network-based electronic transaction processing via a multi-panel based user shopping interface including receiving an indication of a user selection of an icon disposed on a collapsed panel of a multi-panel user interface displayed on an electronic display of a mobile device, wherein the mobile device has received an offer to access a wireless network via a near-field communication transaction conducted with the device; determining with the mobile device a shopping-related function associated with the selected icon by accessing a data table that cross references icons with shopping-related functions, wherein the determined shopping-related function facilitates acceptance of the offer to access a wireless network; and configuring the mobile device to access the wireless network by performing the shopping-related function, wherein the mobile device display depicts the panel on which the icon is disposed as collapsed throughout the performance of the shopping-related function.

The methods and systems of a multi-panel user interface described herein includes a mobile device-based multi-panel user shopping interface that includes at least one active content item disposed on a collapsed panel of the multi-panel based user shopping interface, the active content item for conducting an electronic transaction over a wireless network while the collapsed panel remains collapsed, wherein the mobile device is configured to conduct the electronic transaction via the wireless network as a result of a tap-and-pair NFC action.

The methods and systems of a multi-panel user interface described herein includes a method of network-based electronic transaction processing via a multi-panel based user shopping interface including receiving an indication of a user selection of an icon disposed on a collapsed panel of a multi-panel user interface displayed on an electronic display of a mobile device, wherein the mobile device is configured to access a wireless network based on network configuration information received by the device during a near-field communication transaction conducted with the device; determining with the mobile device an electronic transaction associated with the selected icon by accessing a data table that cross references icons with electronic transactions; and conducting the electronic transaction by communicating over the wireless network, wherein the mobile device display depicts the panel on which the icon is disposed as collapsed throughout the performance of the shopping-related function.

The methods and systems of a multi-panel user interface described herein includes a mobile device-based multi-panel user shopping interface that includes at least one active content item disposed on a collapsed panel of the multi-panel based user shopping interface, the active content item for conducting an electronic transaction over a wireless network while the collapsed panel remains collapsed, wherein the mobile device is configured to conduct the electronic transaction via the wireless network as a result of a visual code scan-and-pair action performed by the mobile device.

The methods and systems of a multi-panel user interface described herein includes a method of network-based electronic transaction processing via a multi-panel based user shopping interface including receiving an indication of a user selection of an icon disposed on a collapsed panel of a multi-panel user interface displayed on an electronic display of a mobile device, wherein the mobile device is configured to access a wireless network based on network configuration information derived by the device from a visual code captured by a camera function of the mobile device; determining with the mobile device an electronic transaction associated with the selected icon by accessing a data table that cross references icons with electronic transactions; and conducting the electronic transaction by communicating over the wireless network, wherein the mobile device display depicts the panel on which the icon is disposed as collapsed throughout the performance of the shopping-related function.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 13 depicts a table representation of panel-icon-shopping function cross-referencing.

DETAILED DESCRIPTION

Figure 1:
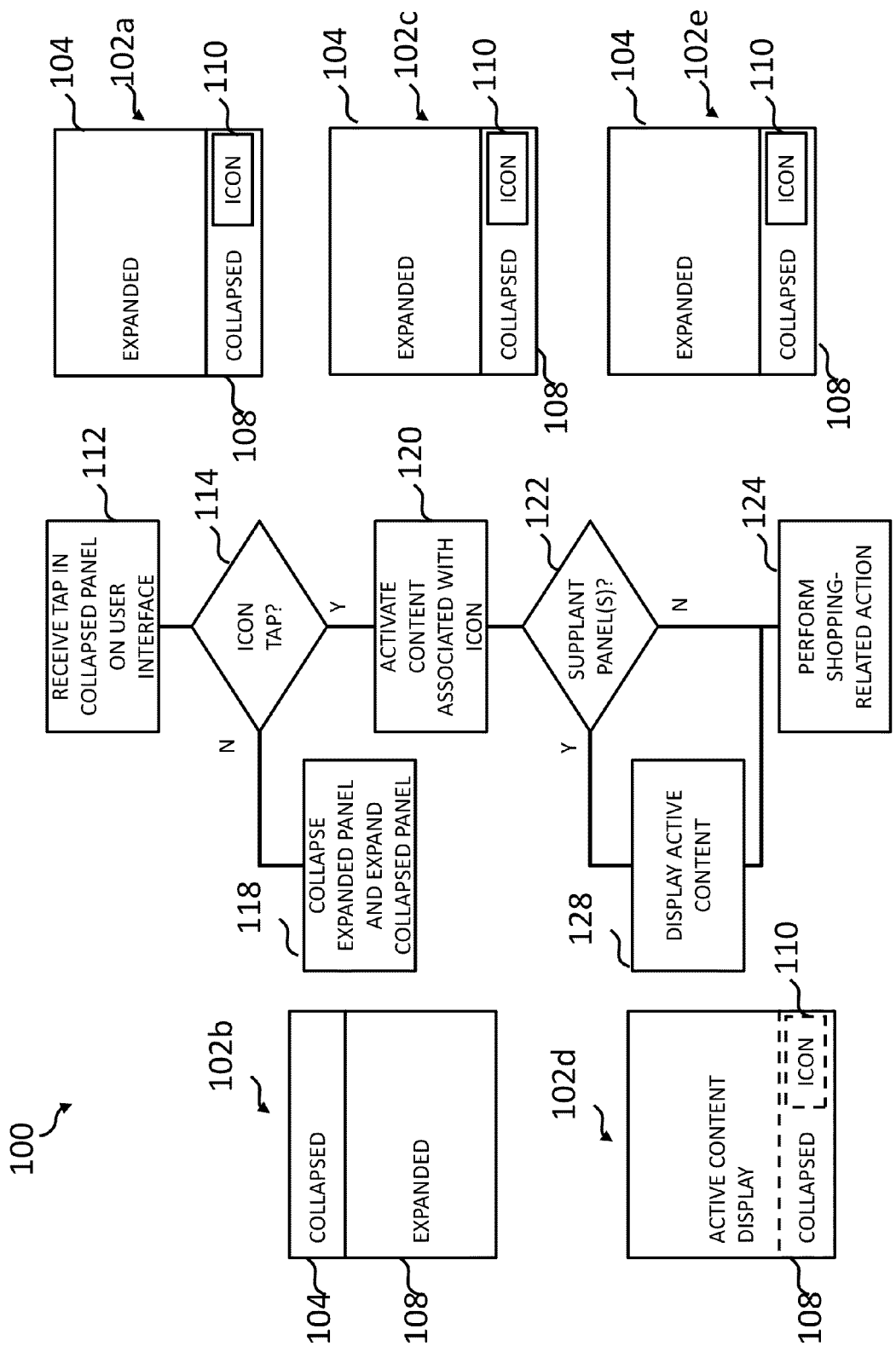
FIG. 1 depicts an exemplary method 100 for presenting a user shopping interface on a mobile device.

FIG. 1 depicts an exemplary method 100 for presenting a user shopping interface on a mobile device in response to a user selection of one or more portions of the shopping interface. The mobile device may include a mobile phone, a Personal Digital Assistant (PDA), a tablet, a handheld computing device, a laptop, a handheld scanner, or any other similar device that may facilitate the user accessing one or more shopping functions using the shopping interface. The method 100 may be configured to present a particular display of the shopping interface on the mobile device display in response to a user's selection of a particular portion of the shopping interface. The shopping interface may be adapted to be presented as a multi-panel interface such that each of the particular displays of the shopping interface may include a plurality of panels that may be presented as expanded or collapsed. The mode of presentation may be based on a user's selection of the one or more portions of the shopping interface.

As depicted in the embodiment of FIG. 1, the plurality of displays 102a-102e (collectively referred herein to as the display 102) of the multi-panel shopping interface may be configured to include an expanded panel 104 and a collapsed panel 108 so that the user may access these panels 104 and 108 to perform one or more shopping related functions without requiring to expand the collapsed panel 108. Alternatively, the shopping interface may include a single expanded panel and a plurality of collapsed panels similar to the collapsed panel 108. In an example, one or more of the shopping related functions may be accessible from a single collapsed panel and if more than one collapsed panel is present, different shopping related functions may be accessible from different collapsed panels. However, a single shopping related function may be accessible from more than one collapsed panel. In another example, different collapsed panels may be associated with different shopping related functions such that each of the collapsed panels is associated with at least one shopping-related function and adapted to activate and perform the respective shopping-related function.

In addition, the collapsed panel 108 may be configured to include one or more active content items, such as an icon 110 that may be accessed by the user to perform a shopping related function. A user may tap or select the icon 110 to activate and/or perform a shopping related function associated with the active content item represented by the icon 110. A user may access the panels or the icons thereof using one or more input devices such as a keyboard, mouse, trackball or track pad, touch screen, voice command recognition module, or any other such user input device.

Referring to the method 100, at step 112, a user input, such as a tap may be received in a collapsed panel of the shopping interface. The user input may be received using any of the aforementioned user input devices elsewhere mentioned or any other device. For example, the user may select the expanded panel 104, the collapsed panel 108 or the icon 110 of the collapsed panel 108. Each such selection may perform a different operation, such as for providing access to a shopping-related function. During this step, the display 102a of the shopping interface may be presented to the user so that the user may select any of the aforementioned portions of the shopping interface using the user input devices.

At step 114, a determination is made as to whether the icon 110 of the collapsed panel 108 is selected by the user. The method 100 may proceed to step 118 if it is determined that the icon 110 is not tapped by the user. At step 118, the expanded panel 104 is collapsed and the selected collapsed panel 108 is expanded. For example, the display of the mobile device may change from display 102a to a display 102b thereby indicating the previously expanded panel 104 is now collapsed and the previously collapsed panel 108 is now expanded. The method 100 may be configured to expand the collapsed panel 108 to facilitate exploring the content of the collapsed panel 108, such as shopping-related functions that may not be visible or accessible in the collapsed state.

The method 100 may proceed to step 120 if it is determined that the icon 110 is selected by the user in step 114. Subsequently, at step 120, content associated with the icon 110 of the collapsed panel is activated. An activation of the content associated with the icon 110 may initiate execution of a shopping related function. For example, in a retail environment, when the user taps or selects the icon 110 of the collapsed panel 108, a purchase action may be executed without requiring expanding collapsed panel 108. On selection of the icon 110 in the collapsed panel 108, the display 102c may be presented to the user. The display 102c may continue to indicate that the user may still access content on the expanded panel 104 or perform a shopping operation associated with the icon 110 of the collapsed panel 108 without changing the collapsed panel 108 to an expanded state. In other words, the display 102c that may be presented to the user in response to a user selection of the icon 110 of the collapsed panel 108, may appear to be identical to or at least similar to the display 102a.

At step 122, a determination is made as to whether the shopping related function executed in response to a user selecting icon 110 of the collapsed panel 108 may need to use a portion of the mobile device display and thereby need to supplant one or more panels, such as the expanded panel 104 of the shopping interface. The method 100 may proceed to step 128 if it is determined that supplanting one or more panels of the shopping interface is required. That is to say, a shopping related function accessed through the icon 110 of the collapsed panel 108 may require further intervention from the user or may simply require presenting displayable content to the user. Otherwise, the method 100 may proceed to step 124 if it is determined that supplanting one or more panels is not required. At step 128, the one or more panels may be supplanted to display active content associated with a selected shopping function. For example, the display 102d that indicates that at least the expanded panel 104 is supplanted to display active content associated with the selected shopping function. The display 102d indicates the collapsed panel 108 in the original collapsed state with icon 110 disposed therein may still be visible to the user. Alternatively, the selected shopping related function may require use of a greater portion of the mobile device display (e.g. a full screen mode of the mobile device) and as a result even the collapsed panel 108 of the shopping interface may be supplanted. In another example, only a portion of the expanded panel 104 may be used by the selected shopping related function.

The method 100 may then proceed to step 124 and may be configured to include performing the shopping relation function accessed through the icon 110 of the collapsed panel 108. While performing the shopping related function accessed through the icon 110 of the collapsed panel 108, the display 102e may be presented to the user indicating that the expanded panel 104 and the collapsed panel 108, may still be in the original state i.e., in the expanded state and the collapsed state respectively. In an example, the user may be watching a video of a specific product or a service from a specific seller in the expanded panel 104 and may decide to purchase an energy drink that can be accessed from the icon 110 of the collapsed panel 108 of the shopping interface. The user may select the icon 110, such as by tapping on the icon 110, and a process of purchasing the energy drink may be initiated without changing the state of the panels 104 and 108. As a result, the user may watch the video without any interruption in the expanded panel 104 and may be able to purchase the energy drink at the same time without expanding the collapsed panel 108 of the shopping interface.

The present methods described herein facilitate the user to perform shopping related functions associated with a specific collapsed panel without expanding the collapsed panel and resulting in the development of a user friendly interface that may allow the user to perform multiple shopping related functions across the multiple panels of the interface. For example, the user may have an access to a payment panel through which payments may be made to the authorized sellers and to a shop panel through which the user may add products into his/her shopping cart without requiring a need to expand the collapsed panels. Further, the shopping related functions may include, without limitation accessing and using shopping vouchers, managing shopping lists, managing a shopping cart, a payment transaction, managing a loyalty card related services, using a discount coupon, performing a mobile recharge function, accepting an offer, redeeming a coupon, rejecting an offer, requesting a price, opening a credit account, closing a credit account, requesting an increase in credit limit, making a fund transfer or any other such function that may enable the user to perform a transaction or take a shopping related action. Other functions accessible through an active content item, without requiring expansion of a collapsed panel may include, accepting an offer of network credentials, requesting access to a wireless network, visually capturing a multi-dimensional code, expanding a collapsed panel, granting a request for a shopping related function to gain access to the device display screen, and the like.

Figure 2:
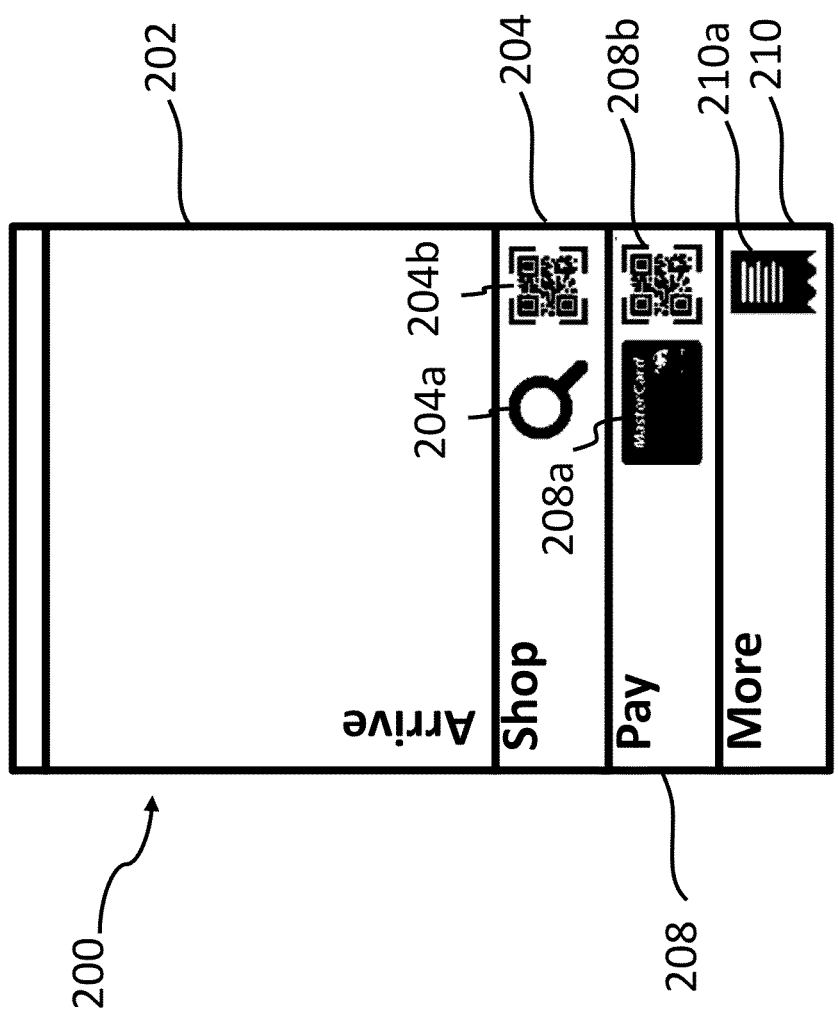
FIG. 2 depicts an exemplary embodiment of a multi-panel shopping interface.

FIG. 2 depicts generally an exemplary embodiment of a multi-panel shopping interface 200 in accordance with an embodiment of the invention. The multi-panel shopping interface 200 may be configured to include at least one expanded panel 202 and a plurality of collapsed panels such as a collapsed panel 204, a collapsed panel 208 and a collapsed panel 210. As illustrated in FIG. 2, the expanded panel 202 may be configured to occupy a larger portion of the display space of the multi-panel shopping interface 200 than any one of the collapsed panels. Each of the plurality of collapsed panels may be configured to occupy a relatively lesser display space available on the multi-panel shopping interface 200 in comparison to the expanded panel 202. Each of the plurality of collapsed panels may be configured to include one or more active content items, such as on or more icons, disposed on a portion of the corresponding collapsed panels.

As illustrated in FIG. 2, the collapsed panel 204 may be configured to include active content items, such as an icon 204a and an icon 204b, the collapsed panel 208 may be configured to include active content items, such as an icon 208a and 208b, and the collapsed panel 210 may be configured to include an active content item, such as an icon 210a. Each of the one or more icons may be configured to provide access to one or more shopping related functions. The multi-panel shopping interface 200 may allow the user to select at least one of the icons disposed on these collapsed panels. For example, the user may select at least one icon such as by providing a single tap on the active icon or by providing a single touch or click on the active icon. On selection of the at least one icon of a particular collapsed panel, a shopping related function corresponding to the selected icon may be performed without expanding the particular collapsed panel. That is to say, the particular panel of the collapsed panel may remain collapsed and the shopping related function may be performed.

The shopping related functions associated with the active icons of the collapsed panels may include services or transactions such as mobile commerce (m-commerce), mobile wallet, purchase transactions, coupon redemption, rewards and loyalty card related transactions, targeted advertisement related transactions, trading related functions, product ordering, travel services or any other such service. For example, the collapsed panel 204 may be configured to provide shopping related functions via the active icons 204a and 204b. In an example, the active icon 204a may be configured as an inspection icon that may be represented by an image of a magnifying glass. The inspection icon 204a may be used to access search related shopping functions. The search related functions may include, but not limited to, identifying product-related details such as product name, product category, product price, product availability, product order status or any other such function. When the user selects the icon 204a, the search function may be performed in the background without an expansion of the collapsed panel 204. The user may access the functions associated with the expanded panel 202 or other active content items disposed on the collapsed panels, such as the collapsed panel 204, the collapsed panel 208 and the collapsed panel 210.

The collapsed panel 204 may be configured to include shopping related functions that may require activating the camera of the mobile device. For example, the active icon 204b on the collapsed panel 204 may be used to access the camera function. The camera function may include accessing a camera to capture an image for performing the shopping related functions. The image capture may be used to perform, for example, a scanning function that may be used for scanning a barcode or other visual code (e.g. 2D code, QR code and the like) associated with a product. For example, a user may be accessing the multi-panel shopping interface 200 from his/her mobile phone in a retail store. The user may come across a product and may want to make a purchase decision based on the pricing information of the product. The user may bring the mobile phone within the field of view of the product and select the active icon 204b. The selection of the icon 204b may activate the mobile phone camera to read the product visual code and perform product identification functions while the collapsed panel 204 may remain in a collapsed state. Once the product identification is complete, the multi-panel shopping interface 200 may display the product information, such as the product price to the user. The user may then make a purchase decision as to whether to purchase the product or not. In an example, if the user decides to purchase the product, a collapsed panel on the multi-panel shopping interface 200 may be configured to provide payment related functionality to the user via the one or more active icons disposed on the same collapsed panel 204 or any other collapsed panels from the plurality of collapsed panels.

Further, the active content items disposed on the collapsed panel 208 may be configured to activate payment-related shopping functions on the multi-panel shopping interface 200. The collapsed panel 208 may include the active icon 208a for accessing the payment function and 208b for accessing the camera function. In an example the user may access the camera function as discussed previously to identify product details. Further, the user may access the payment function by selecting the active icon 208b for example when the user decides to make a purchase decision for the product. In an example, the active icon 208a may be represented as a credit card icon to represent that the icon may be used for making a payment through a credit card. When the user selects the active icon 208a, a payment transaction may be initiated. In an example, the user may scan the product using the camera function, identify the price of the product and then select the payment icon 208a. As a result of selecting, an amount equivalent to the product price may be deducted from the user's banking account and the product may then be acquired by the user. All these transactions may be operated so that the user may continue to perform other shopping related functions on the multi-panel shopping interface 200 and the collapsed panel 208 may remain in its collapsed state. Additionally, the collapsed panel 208 may be expanded if the active icon 208a or the 208b may need any user intervention to complete the transaction corresponding to the shopping related functions, in some examples. The collapsed panel 208 may supplant a portion or an entirety of other panels such as the expanded panel 202 and/or other collapsed panels in such cases.

In addition, the multi-panel shopping interface 200 may allow the user to access other shopping related functions such as by accessing the collapsed panel 210. The active icon 210a disposed on the collapsed panel 210 may be accessed to perform more functions such as managing a shopping cart, managing financial resources, such as bank accounts, for the user, banking transactions, accessing buyer or seller information for the products or services in a current geographical region of the user, mobile device management, accessing additional details about the product, tagging or marking products, sharing data, or any other such service that may need to perform a transaction without changing the state of the collapsed panel 210 from a collapsed state to an expanded state.

The multi-panel shopping interface 200 as described herein may allow the user to access the active icons from the at least one collapsed panel without expanding of the collapsed panel. As discussed, the user may access the active icon 204a to access the information associated with a first product and the active icon 208a to perform the payment transaction of a second product. The multi-panel shopping interface 200 allows the user to perform these functions associated with the active icons 204a and 208a without expanding the corresponding collapsed panels such as the collapsed panel 204 and collapsed panel 208. These functions continue to be executed without any further user intervention. As a result, the multi-panel shopping interface 200 enables the user to execute multiple shopping related functions in a relatively user friendly manner where the user may not be interrupted while performing the shopping related functions associated with the expanded panel 202 of the multi-panel shopping interface 200.

Figure 3:
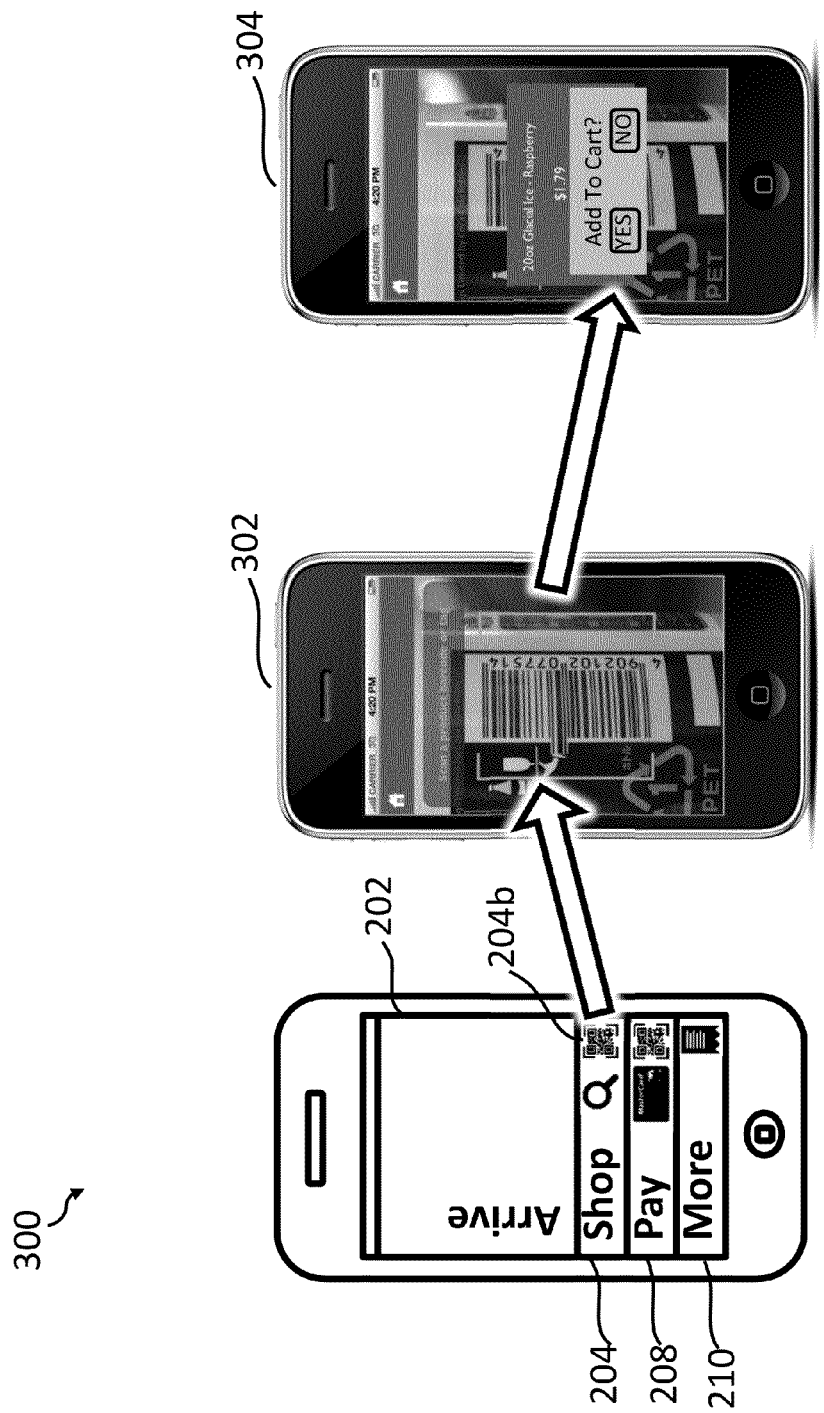
FIG. 3 depicts performing a shopping function that utilizes a code scanning capability.

FIG. 3 depicts generally an example of a method 300 for performing a shopping function that may include scanning of a product using the mobile device of the user. As illustrated, the mobile device may include a display configured to include a stacked expandable panel user interface that may include the expanded panel 202 and one or more collapsed panels such as the collapsed panel 204, the collapsed panel 208 and the collapsed panel 210. Each of the one or more collapsed panels may be configured to include an active content item, such as an icon, that may be disposed on the collapsed panels. The active content associated with a specific collapsed panel may be activated by a single tap or selection of the icon and such a tapping or activation may be used to execute a shopping function that may be desired by the user. The single tap of the icon may facilitate performing the shopping function without expanding the corresponding collapsed panel.

The mobile device may be configured to operate in proximity of a shopping item such as a product labeled with a product identification code, for example when the user may be visiting a retail store. The user may then tap the active icon 204b, which may be configured to operate as a scan code icon, to perform a shopping action. The scan code icon 204b may be configured to activate a camera of the mobile device to perform a plurality of scans including but not limited to a 2D scan function, a barcode reading function, a visual code reading function to identify the shopping item, and the like. The scan code function may be configured to present the display captured scan code to the user on the display of the mobile device. Screen image 302 depicts an image being displayed on the mobile device in response to an activation of the scan code function of the mobile device due to the single tap of the icon 204b.

In an example, the shopping action may include one of the purchasing of the item and adding the item to a shopping cart in response to detecting the scan code of the shopping item. The display 304 illustrates an example of enabling a user of the mobile device to add an item to the shopping cart upon detection of the scan code of the shopping item. The display of the mobile device may provide an alert message to confirm or reject the selection of the shopping item. In an example, the alert message may be adapted to receive a confirmation from the user regarding whether the shopping item may be added to the shopping cart. In an example, the shopping action may need an entire display of the mobile device such as to assist the user while execution of the one or more shopping functions. Alternatively, the shopping action may be configured to execute while the collapsed panel 204 remains collapsed during the shopping action.

Figure 4:
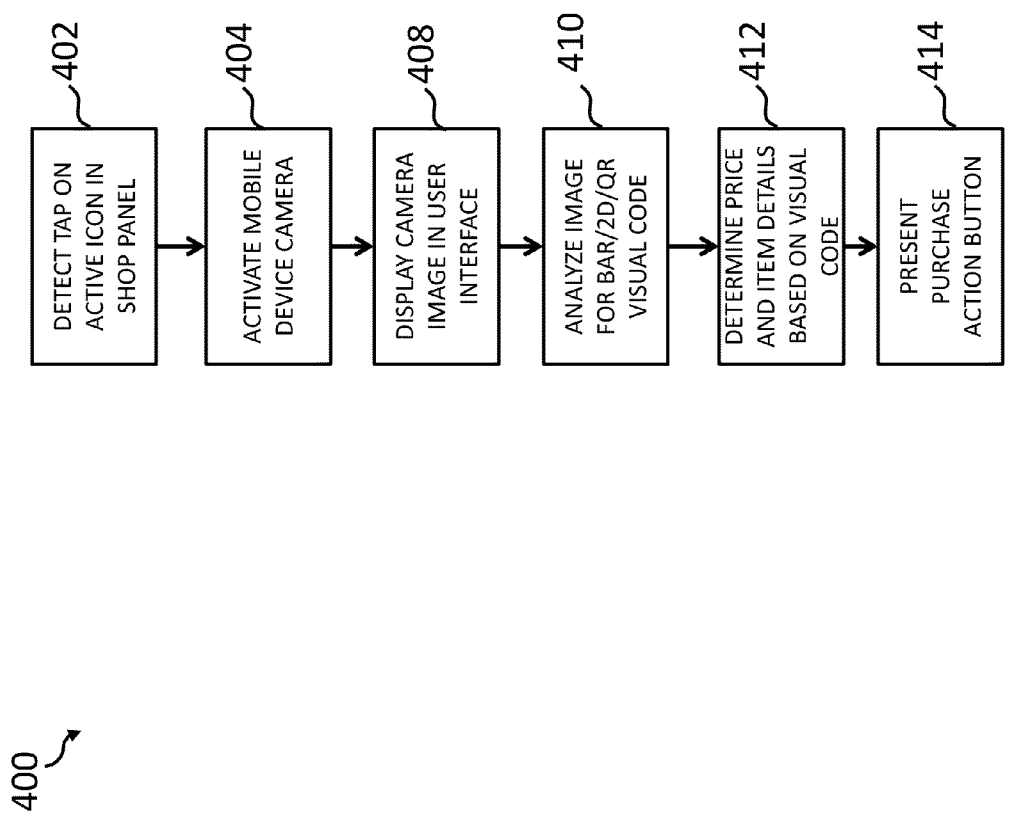
FIG. 4 depicts a flow chart of an embodiment of performing the shopping function depicted in FIG. 3.

FIG. 4 depicts generally an example of a method 400 for performing a shopping related function using the multi-panel shopping interface. At step 402, a tap on an active icon of a panel of the multi-panel shopping interface is detected. The active icon may be disposed on at least one collapsed panel of the shopping interface so that a user may tap the icon so as to access the active content item associated with the icon of the collapsed panel of the shopping interface without necessarily requiring expanding the collapsed panel. The active content item may be configured to provide access to a shopping related function, such as the camera function as discussed in conjunction with FIG. 3. For example, when the user selects the icon 204b of the collapsed panel 204 on the display of the mobile device, a shopping related function that may use the mobile device camera \ without expanding the collapsed panel 204. The following description for FIG. 4 is provided to discuss the method in an example of executing the shopping related function employing usage of the camera. However, several other shopping related functions employing other functionalities of a mobile device for facilitating several other shopping related functions may be performed in a similar manner without limitations.

At step 404, the camera of the mobile device may be activated to execute the shopping related function associated with the active content item such as the icon 204b of the collapsed panel 204 in response to the detection of the tap on the icon 204b of the collapsed panel 204. In an example, the camera of the mobile device may be configured to capture an image of an object that may be in the proximity of the mobile device. For example, the camera may be configured to capture an image, such as a visual code displayed on a label attached to a shopping item in a retail store. The visual code image can be a bar code or any other identification code. In another example, the camera may be configured to scan the image. Once the camera is activated, the method 400 may include displaying the image acquired by the camera on the display of the interface presented on the mobile device, at step 408. In an example, the image may require to be displayed on the entire display space of the mobile device. In this scenario, the expanded panel and the one or more collapsed panels of the multi-panel shopping interface 200 may be supplanted by the camera image. In another example, the camera image may require only a portion of the display space of the mobile device. In this example, one or more collapsed panels may remain visible on the display along with the camera image and only the expanded panel may be supplanted to present and display the image.

At 410, the camera image is analyzed to identify the visual code that may be associated with the image. In an example, the visual code may include a barcode, a 2D code, a Quick Response (QR) code, or any other similar identification mark. At step 412, item or product details such as for example price and other items details associated with the shopping item may be determined using the information as retrieved from the identification of the visual code. The method 400 then may be configured to include determining other attributes such as, manufacture date, expiry date (if any), shipment date, maintenance date, insurance details, or any other such details of the shopping item using the visual code associated with the shopping item. In an example, the details regarding the shopping item may be presented on the display of the mobile device. The user of the mobile device may use the presented details to make a purchase decision for the shopping item. At 414, a purchase action button on the mobile device display is presented. The purchase action button may include such as an alert button that the user may click to initiate or reject a purchase transaction for the shopping item.

Figure 5:
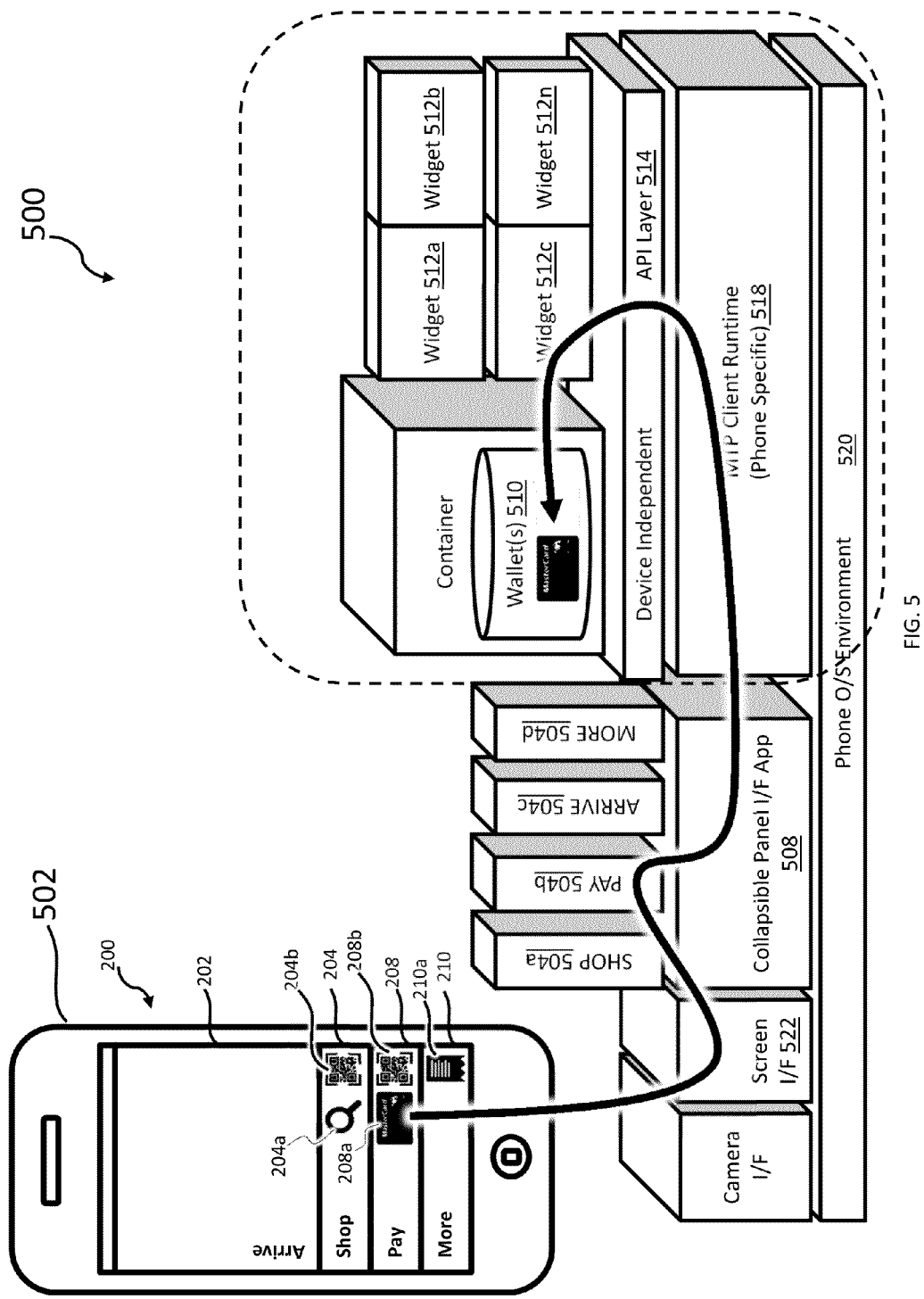
FIG. 5 depicts a client mobile wallet architecture for use in an ecosystem for performing shopping functions accessed via the multi-panel shopping interface.

FIG. 5 depicts exemplary client architecture 500 for use in an ecosystem for performing an electronic transaction via an electronic wallet function of a mobile device 502. The electronic transaction may include business transactions that may occur between business-to-consumer (B2C), business-to-business (B2B), and consumer-to-consumer (C2C) for selling and/or buying of goods or services. For example, the electronic transactions may include a shopping related function that may be desired by the consumer for purchasing goods and/or services, a banking transaction performed to deliver payments to the business and any other e-commerce related business transaction that may promote the businesses.

The client architecture 500 of the mobile device 502 may be configured to provide the multi-panel shopping interface 200 to the user. The multi-panel shopping interface 200 may be configured to include the at least one expanded panel 202 and a plurality of collapsed panels such as the collapsed panels (e.g., the collapsed panel 204, the collapsed panel 208 and the collapsed panel 210) so that the user may access these panels to perform one or more shopping related functions without requiring to expand the collapsed panels. In an example, one or more of the shopping related functions may be accessible from a single collapsed panel and if more than one collapsed panels are present, different shopping related functions may be accessible from different collapsed panels. However, a single shopping related function may be accessible from more than one collapsed panel. Further, each collapsed panel may be configured to include the one or more active content items (e.g., icons 204a, 204b, 208a, 208b, 210a, and the like) that may be accessed by the user to perform the shopping related functions. A user may tap or select the icons to activate and/or perform the shopping related functions associated with the active content item represented by icon 110.

The client architecture 500 may be configured to include a container based approach to support multi-tenant application architecture for providing electronic transaction related services to the users. As illustrated in FIG. 5, the client architecture 500 may be configured to include applications such as shopping related applications 504a, payment related applications 504b, and arrival related application 504c and other applications 504d such as to provide an access to a wide variety of applications to the user to perform the shopping related functions. In an exemplary embodiment of FIG. 5, each of the collapsed panels may be configured to be associated with the respective applications such that the user may access these applications to perform the shopping related functions without expanding the collapsed panels. In addition, the applications 504 may be configured to interact with a collapsible panel interface 508 so as to access one or more resources of the mobile device 502 to perform the shopping related function as desired by the user. As described later in the description, the client architecture 500 may be configured to perform the electronic transaction via the electronic wallet function of the mobile device 502 in response to a user selection of an icon disposed on the collapsed panel of the multi-panel shopping interface 200.

In an example, the mobile device 502 may be configured to perform shopping related functions or business specific services using one or more wallet applications such as a wallet 510. Each form of payment held in the wallet 510 may be accessible by a payment-type specific widget application, such as a widget app 512a, a widget app 512b, a widget app 512c, and a widget app 512n (generically referred to herein as a "widget 512"). In an example, a plurality of shopping related functions or the business specific service may be distributed among the one or more wallet applications so that one or more wallets 510 may be accessed by an appropriate widget 512 for performing the shopping related function as desired by the user. Further, the wallets 510 and the widgets 512 may be installed using the container based approach to provide functionality including business rules adherence, wallet and widget application lifecycle management, user experience management and other functionality.

In addition, the one or more wallets 510 and the widgets 512 may be developed using a Software Development Kit (SDK) of a mobile transaction platform (MTP) as described below in FIG. 7 and may be supported by a device independent application programming interface (API) layer 514, a device-specific client runtime environment 518, device-specific operating system environment(s) 520, and the like. The device independent API layer 514 may ensure that the wallets 510 or the widgets 512 developed using the SDK may run across all supported devices. The client runtime environment 518 may handle complexity related to application execution, transactional security, reliability, and other business operations that may be initiated on receiving a request from a user. Further, these APIs are specifically designed to provide all the support that the developer may need to create rich user experiences as the device independent API layer 514 abstracts the development of the wallets 510 and the widgets 512 from the underlying device-specific client runtime environment 518 and operating system environment(s) 520. In addition, the wallet 510 may define additional APIs for the widget developers that may be specific to the application's context (financial, retail, healthcare, government, etc.).

The methods and systems described herein may facilitate the user to perform the shopping related function using the wallet 510 of the mobile device 502 without expanding the collapsed panels. As illustrated in FIG. 5, the user may select the active content associated with the icon 208*a* of the collapsed panel 208 to perform a payment transaction request. The user may utilize the screen interface 522 such as a touch screen to select the active content item 208*a*. The screen interface 522 may provide information associated with the user selection to the payment related application 504*b* via the collapsible panel interface 508. On receiving the selection of the active content 208*a* of the collapsed panel 208, execution of the corresponding payment related application 504*b* may be initiated. The payment related application 504*b* may include instructions regarding usage of one or more computing resources (e.g., software and/or hardware), work flows and the other features of the mobile device 502 that may be required to complete the payment transaction request as initiated by the user. As shown in the example embodiment of FIG. 5, the payment related application 504*b* may be configured to route relevant information to the wallet 510 via the client runtime environment 518 and the device independent API layer 514. Further, a particular widget (e.g., the widget 512) associated with the payment card may be activated and details of the payment card within the wallet 510 may be accessed to perform the payment related transaction.

Figure 6:
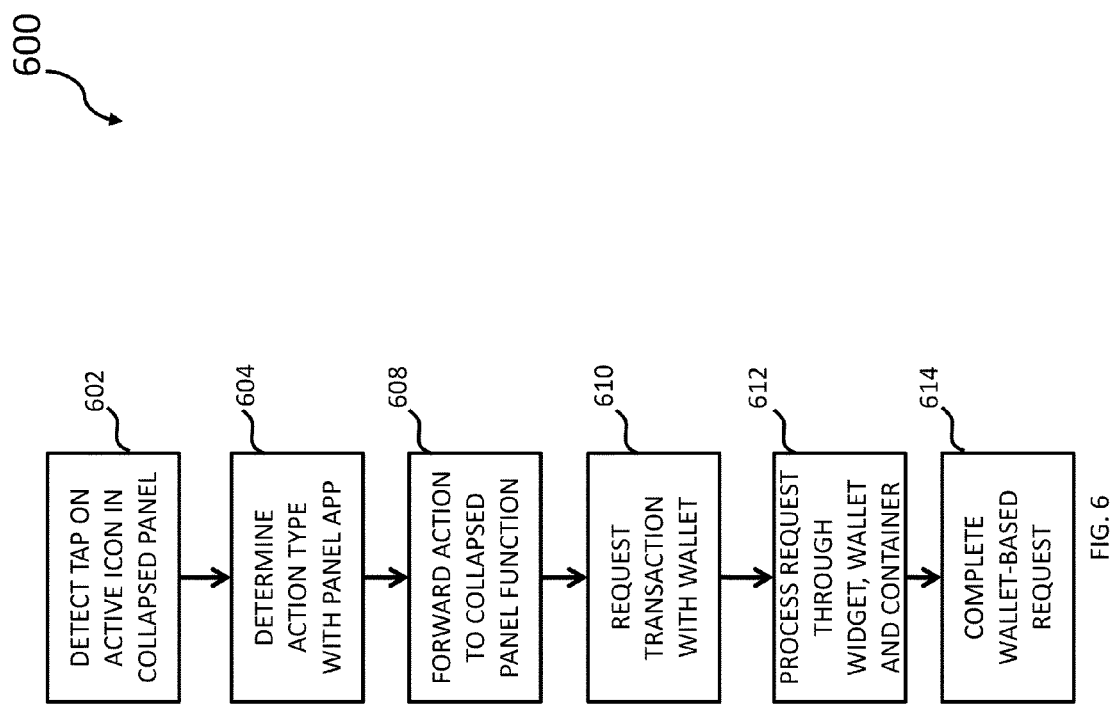
FIG. 6 depicts a flow chart of an embodiment of performing an electronic transaction via an electronic wallet function of a mobile device.

FIG. 6 depicts generally an example of a method 600 for performing an electronic transaction via an electronic wallet function of a mobile device. The method 600 herein is described with reference to the exemplary embodiment of FIG. 5. At step 602, a tap on an active icon of a collapsed panel of the multi-panel shopping interface is detected. The active icon may be disposed on at least one collapsed panel of the shopping interface so that the user may tap the icon so as to access the active content item associated with the icon of the collapsed panel of the shopping interface. At step 604, an action type associated with an application of the panel is determined. For example, the action type may include a code scan function accessing the mobile device camera to capture and analyze the captured image to decode a visual code that may be associated with a shopping item that is in proximity to the user. In another example, the action type may include authorizing purchasing a shopping item or other type of transaction. Therefore, upon selection or tapping of the respective icons for the code scan or payment authorization, the respective shopping related applications of using the camera for scan code detection and payment authentication may be initiated. Execution of the various applications associated with an active content icon may likewise cause access of various facilities provided by the mobile device when an icon is selected or tapped. For example, a user may not need to activate the camera manually after selecting an icon pertinent to the camera to effect identification of a product that is in proximity of the user.

On determination of the action type, the method 600 may proceed to step 608 where the determined action details may be forwarded to a function of the collapsed panel. For example, tapping a purchasing-related active content icon may result in the action details being forwarded to a payment related function via a collapsible panel interface function executing on the mobile phone. At 610, a transaction request is made with the wallet of the mobile device to perform the shopping related function. For example, the payment related application 504*b* may identify the type of the wallet that may be required to complete the transaction request. The payment related function 504*b* may identify at least one wallet that may be required to access the credentials of the users while making a purchasing transaction. At step 612, the transaction request is processed through a widget that is selected based on the form of payment being requested, which in turn accesses a portion of a wallet that may be associated with a wallet container. For example, the payment related function 504*b* may be configured to route relevant information to the wallet 510 via the client runtime environment 518 and the device independent API layer 514 as discussed in conjunction with FIG. 5. Further, a particular widget (e.g., the widget 512*c*) associated with the payment card may be activated and details of the payment card within the wallet 510 may be accessed to perform the payment related transaction. At step 614, the wallet based request is completed. The collapsed panel on which the selected active content icon that is displayed may remain in the collapsed state during tapping and in some examples during the execution of the entire method 600, and thereby allowing the user to continue to access the contents associated with the other panels such as the 202 of the multi-panel shopping interface.

Figure 7:
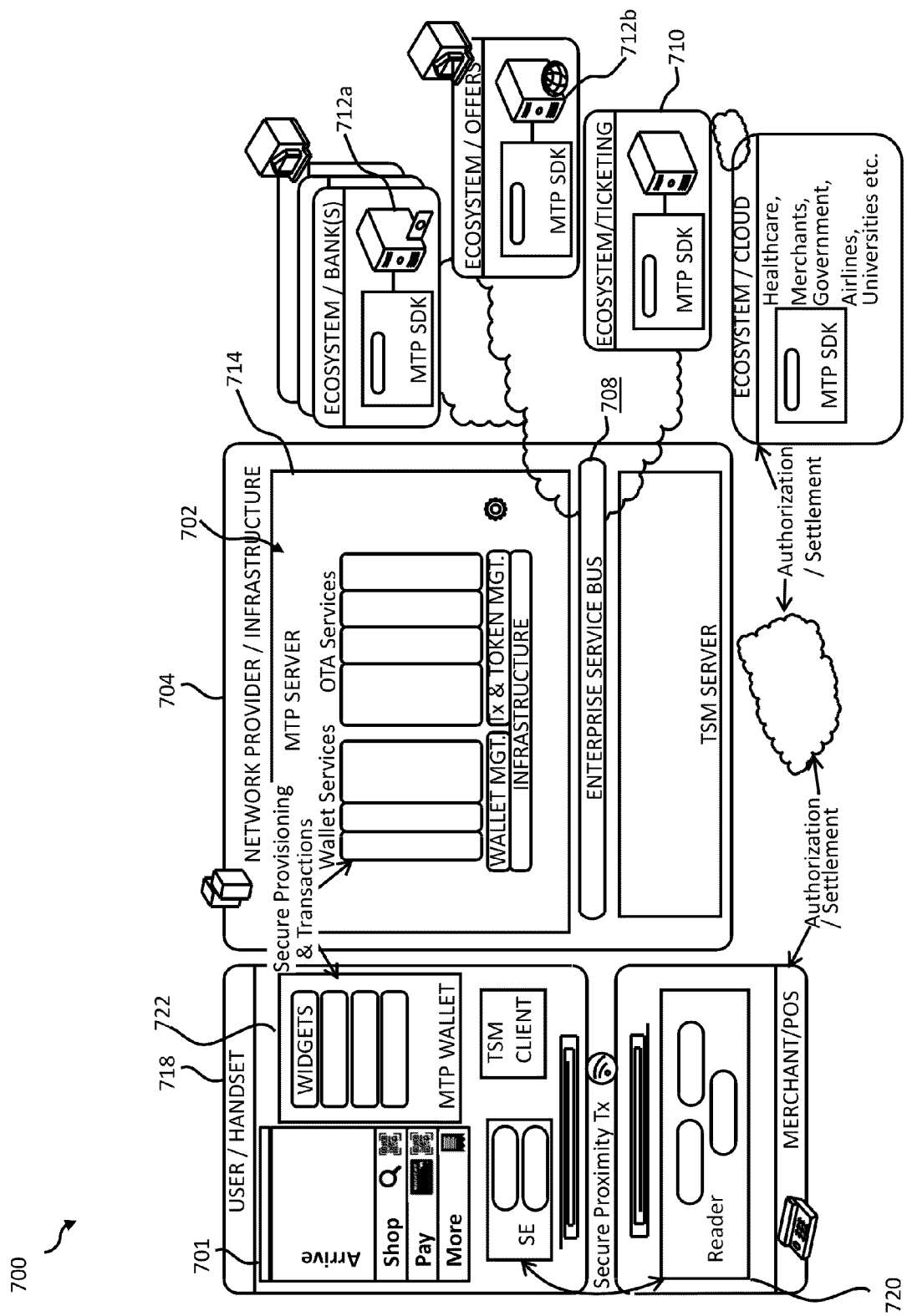
FIG. 7 depicts an ecosystem for performing transactions via a multi-panel user interface of a mobile phone.

FIG. 7 depicts generally an architecture of a system 700 configured to perform an electronic transaction for a mobile device including the multi-panel shopping interface. The system 700 illustrates a dynamic ecosystem that may be used for performing shopping related functions (e.g., mCommerce and mPayment transactions) using a mobile device payment infrastructure that may include a mobile wallet, widgets, and the like as described herein. The dynamic ecosystem 700 may include a user handset 718 including the multi-panel shopping interface 701, a network provider's domain 702 integrated into a system of a network provider 704, an enterprise service bus 708, an ecosystem of service and security providers 710, 712*a*, and 712*b*, a message transaction platform (MTP) 714 and a merchant or Point-Of-Sale (POS) terminal 720.

The dynamic ecosystem 700 may be used to perform a plurality of shopping related functions that may be accessed by a user accessing the ecosystem via the user handset 718. The user handset 718 may include a multi-panel shopping interface 701. The multi-panel shopping interface 701 may include a plurality of panels including an expanded panel and one or more collapsed panels. The one or more collapsed panels may further include active content items, such as one or more icons, that may be disposed on the one or more collapsed panels. In an example, the active content items may be used by the user for gaining access to the plurality of shopping related functions supported by the dynamic ecosystem 700. In an example, the dynamic ecosystem 700 may be configured for secure personalized transactions via the mobile wallet functions of the user handset 718. The mobile wallet functions may be accessed for example by selecting the one or more icons on a collapsed panel. The mobile wallet functions may then be executed without requiring the collapsed panel to be expanded. In an example, the mobile wallet functions may include secure mobile transactions that may need to be executed in a secure computing environment. For example, the mobile wallet functions may include secure mCommerce and mPayment functions. The secure mobile transactions may be enabled by the network provider's system domain that may include the network provider system 704.

In an example, the MTP 714 may be configured to deliver services such as messaging and notification, security and authentication, over-the-air (OTA) provisioning, OTA trusted service manager (TSM) proxy operation, client-based secure ecosystem container operation, wallet and widget management, transaction engine operation, digital instrument management, location and/or geo-fencing support, augmented reality, and the like. The MTP 714 may be configured to power a dynamic ecosystem for secure mCommerce and mPayment transactions as described below. The MTP may be set up in the network provider's domain 702 and integrated into the system of the network provider 704. In an example, the enterprise service bus (ESB) 708 of the network provider 704 may be used for integration. The MTP 714 may be connected to an ecosystem of service and security providers 710, which may include one or more trusted service managers (TSMs), for example, 712*a*, and 712*b*. The network provider 704 may use the MTP 714 to create a branded mobile application targeting a specific business vertical. In an example, the mobile application may be the mobile wallet (mWallet) for the retail/financial domain or a mHealth application for the healthcare vertical. In an example, the mobile application may provide a core set of services to a user, specific to a domain for which it may have been created. For the purpose of this invention, the mobile application may be a wallet assuming a retail domain application.

For example, the mobile wallet application may be a shopping related application that may enable a user to pay for products purchased in the retail domain environment. The mobile application can include a collapsed panel for a "shop" function, hereinafter referred to as a "shop" collapsed panel, which may be presented to the user on the display of the user handset 718. As illustrated, this collapsed panel may include a plurality of icons, including an icon for a payment function. The user can select an icon for executing the payment function by selecting the payment related icon on the "shop" collapsed panel. In response to the selection, the payment function may be executed, while the "shop" collapsed panel may remain in the collapsed state and need not be expanded. The payment function may allow performing a secure banking transaction over the MTP 714 platform or any other similar transaction.

In an example, the mobile wallet application may also facilitate application lifecycle and security, standardized user experience and widget management responsibilities. The widget may provide specific business services and complies with the wallet guidelines. The mobile application may be downloaded onto the user handset 718. The ecosystem of services 710 may be configured to authenticate any transaction done over the handset 718. In an example, the user handset 718 may be used at the merchant terminal 720 for making payment for one or more products using the payment function of the mobile application through a collapsed panel without requiring to expanding it. The merchant terminal 720 may be configured to receive communication from the ecosystem cloud 710 regarding the widget authentication of the user handset 718 widget 722 when used in vicinity of the merchant terminal 720 for effecting a transaction. The communication regarding authentication may be received in response to an activation of the payment related icon on the "shop" collapsed panel of the user handset 718.

In an example, individual, independent service providers may use the MTP SDK to build widgets that may be loaded into the wallet. These widgets may provide incremental functionality that may enhance the overall appeal of the mobile application. The wallet and the widgets may provide the users with OTA value added services (VAS) and proximity NFC services. The container (or MTP mClient runtime) may provide the wallet and the widgets a secure runtime environment and the services to communicate OTA with the server (OTA services) and also communicate with the secure element to manage payment and non-payment applets for proximity NFC transactions. The multi-panel shopping interface 701 may facilitate the users in performing the proximity NFC transactions. For example, the user may be able to make a payment for the NFC transaction by accessing a payment icon from a collapsed panel, such as a "pay" collapsed panel. The payment icon may activate payment related functions such as initiating contact with the user's TSMs, such as the bank ecosystem 712*a*.

In an example, the widgets may have an associated applet running in the secure element. In an example, the widgets may not have an associated applet running in the secure element. In an example, the service providers may only choose to provide only OTA services. In an example, the MTP and TSMs may collaborate together to provide the entire NFC experience. In an example, the wallet and the widget (including soft card) provisioning, setup and management may be handled by the MTP 714, while applet issuance and personalization may be done by the TSM. In an example, the network provider may ensure that the NFC readers at merchant locations may be equipped to handle the proximity protocols that may be used by the various applets that may have been loaded into the phone's SE. These readers may then process the transaction through an acquiring network that may switch the transaction to the appropriate ecosystem service provider in the cloud. The wallet and/or the widget may communicate with the ecosystem cloud to determine service status and various other VAS requirements like balance, transaction history, stored value top-up, and the like.

In exemplary and non-limiting embodiments, the MTP 714 may be configured for providing the wallet, the widget, and manage the transaction along with all the relevant business services that may be associated with delivering wallets to a universe of diverse mobile environments. In exemplary and non-limiting embodiments, the MTP may be configured for providing an improved SDK that may to help build a wallet and ecosystem of service providers that may create widgets with elaborate feature sets without having to worry about handset fragmentation. In exemplary and non-limiting embodiments, the MTP 714 may be configured for establishing connectors with various ecosystems to deliver a dynamic user experience and diverse set of services to the end user that may be accessed irrespective of time and geographical location.

The MTP 714 may be deployed for customers from various countries and may be tailored to specific country requirements. For example, the MTP may be used in The United States of America (USA), Japan, China, India, Singapore, Mexico, and Bolivia, for a variety of mCommerce and mPayments services. In exemplary and non-limiting embodiments, the MTP 714 may be configured for providing banking services, ticketing services, and payment services using one or more collapsed panels on the multi-panel shopping interface 701 of the user handset 718. In an example, the services provided by the MTP 714 may be accessed by selecting a plurality of icons on a single or more than one collapsed panel. In an example, the services provided by the MTP 714 may be accessed by selecting at least one icon on each of a plurality of collapsed panels. The different services provided by the MTP 714 may be accessed at the same time, and may be executed in the background, without requiring any or all of the collapsed panels of the user handset 718 to be expanded.

In exemplary and non-limiting embodiments, the MTP 714 may be deployed in a cloud and may be configured to aggregate various disparate service providers, to effectively provide end users with a suite of personalized secure transactional services. In an example, the network providers may deploy the enabling layer of the MTP 714 (for example, the wallet and the transaction management along with infrastructure components), which may be agnostic to the services and channels. The enabling layer of the MTP 714 may be configured to support an ecosystem of service providers for example, banks, merchants, healthcare providers, and the like. The enabling layer of the MTP 714 may be configured to support all third party developers that may use the SDK to build their individual personalized applications for example, secure transaction applications.

Figure 8:
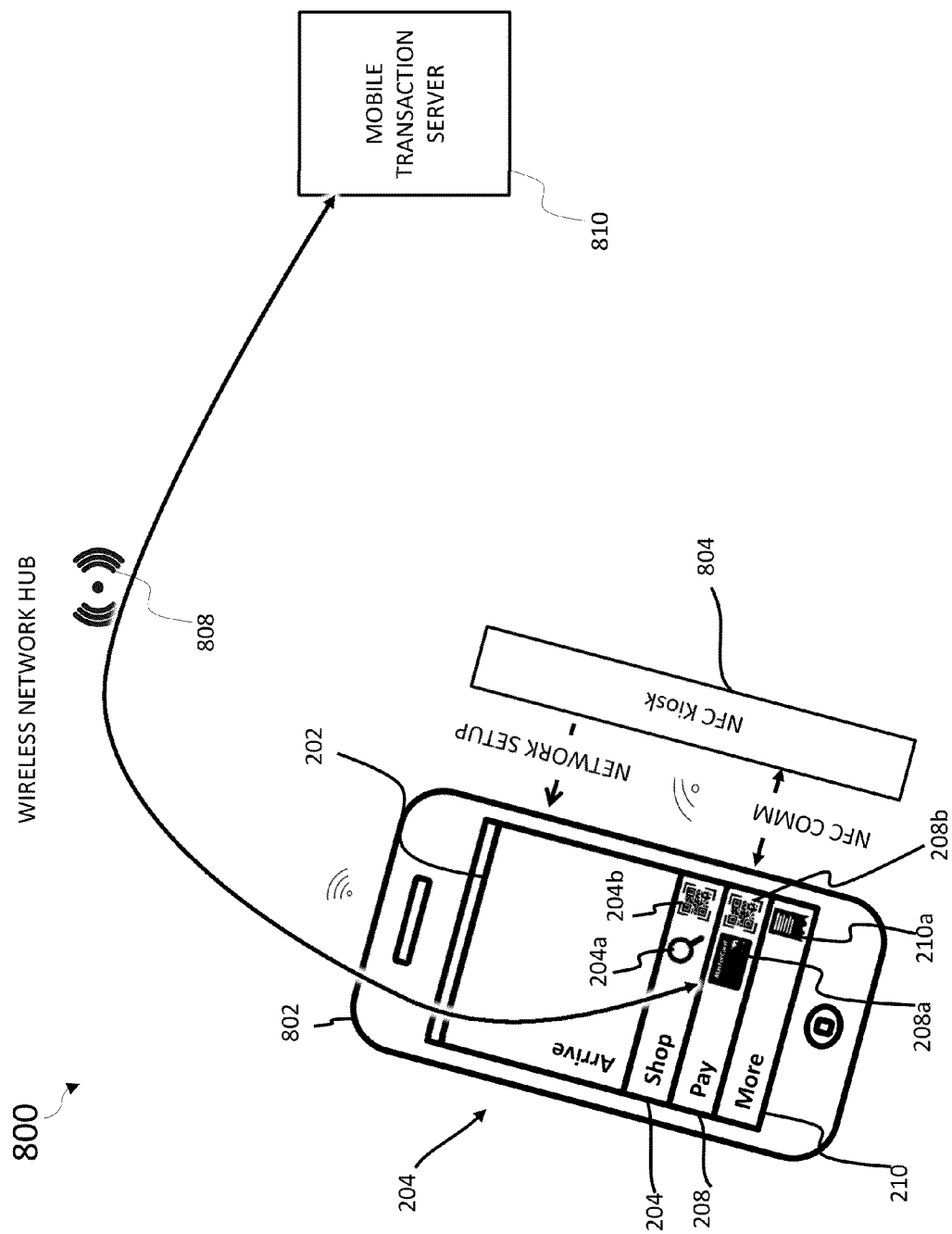
FIG. 8 depicts an environment for performing shopping transactions via a multi-panel user interface of a mobile phone over a wireless network to which access has been obtained via a NFC operation.

FIG. 8 depicts an example of a retail environment 800 in which the multi-panel shopping interface 200 of the mobile device (such as a mobile device 802) may be used. In an example, the mobile device 802 may be configured for use in a near field communication (NFC)-based environment to perform authentication for mobile transactions. The retail environment 800 may include an NFC point of sale (POS) terminal 804, a wireless network hub 808, a mobile transactions server 810, and the multi-panel shopping interface 200 of the mobile device 802 to perform functions related to electronic commerce. The multi-panel shopping interface 200 may allow the user to select at least one icon of the collapsed panels. The multi-panel shopping interface 200 may be configured such that any of the active content items disposed on the collapsed panels may be selected by a mobile device user, without requiring the collapsed panels to be expanded. The multi-panel shopping interface 200 may facilitate performing shopping-related functions over a wireless network. The shopping related functions associated with the active icons of the collapsed panels may include services or transactions such as mobile commerce (m-commerce), mobile wallet, purchase transactions, coupon redemption, rewards and loyalty card related transactions, targeted advertisement related transactions, trading related functions, product ordering, travel functions or any other such functions.

In an example, the shopping related functions may be accessed via the collapsed panels presented on the display of the mobile device 802 over a long range wireless network by using the wireless network hub 808. In other examples, other communication channels may be used to access the shopping related functions. For example, the access to the wireless network may be provided via a Bluetooth application on the mobile device 802. The access to the wireless network may be provided via a wireless application of the mobile device 802. In some examples, the multi-panel shopping interface 200 may gain access to the wireless network through a network information exchange Near Field Communication (NFC) wireless transaction.

The mobile device 802 may acquire access to network-based transaction authentication information through a tap-and-pair NFC function of the mobile device 802. Such a tap-and-pair NFC function may be accessible via and/or incorporated into the shopping interface 200. NFC-based network authentication may be facilitated by any of the active content items such as the icons 204a, 204b, 208a, 208b, 210a, and the like while the respective collapsed panels 204, 208, and 210 may remain collapsed. For example, the active content item 204a may be configured to facilitate use of network-authentication information received from the NFC POS terminal 804 for connecting to a wireless network to enable performing or completing a mobile transaction with the mobile device 802, while the collapsed panel 204 remains collapsed. Alternatively, the tap-and-pair NFC network authentication-related function may be incorporated as a separate feature of the mobile device 802 that results in allowing the shopping interface to have access to networked resources, such as the mobile transaction server 210 and the like. The NFC POS terminal 804 may provide a means to transfer at least a portion of transaction, device, user, network, security, and payment-related information between the mobile device 802 via the wireless network hub 808 with a backend transaction processing system in a communication network, such as mobile transaction server 810.

The NFC POS terminal 804 and tap-and-pair functionality may facilitate configuring the mobile device 802 to quickly transfer the payment-related information via NFC, Bluetooth, Wi-Fi, and the like communication channels without requiring the collapsed panels 204, 208, and 210 to be presented in the expanded state. The multi-panel shopping interface 200 may be configured so that at least one active content item disposed on the collapsed panel is configured for confirming access to a wireless network that may be identified via an NFC-based tap-and-pair operation while the collapsed panel remains collapsed. In an example, one of the active content items such as the icons 204a, 204b, 208a, 208b or 210a may be configured to accept network access to a network identified via a tap-and-pair operation without requiring the collapsed panels 204, 208, and 210 to first be expanded. While the NFC POS terminal 804 may support wireless communication within four centimeters of the wireless communication device 104, the wireless network hub 808 may be used to enhance the range of wireless communication, which may allow the mobile device 802 user (such as a consumer) to move or walk about and in proximity to the retail environment 800 while performing electronic transactions, and the like as described herein.

A wireless network of a shopping environment (e.g. retail consumer store) may be configured to include the wireless network hub 808 as illustrated in the FIG. 8, and described herein. The wireless network hub 808 may be configured to enable the mobile device 802 to wirelessly communicate in the retail environment 800 so as to facilitate a wide range of touch point opportunities associated with a purchase, an offer, or any other electronic information exchange, including mobile transactions. As shown in FIG. 8, the mobile device 802 may be configured to acquire access of the wireless network hub 808 through an NFC function of the mobile device, such as a tap-and-pair function described herein. One or more of the active content items such as the icons 204a, 204b, 208a, 208b or 210a may be configured via an NFC-based tap-and-pair operation to perform a shopping related function using the wireless network hub 808 while the respective collapsed panels 204, 208, and 210 may remain collapsed during initiation or during performance of the shopping related functions. In this way, shopping-related functions that are accessible via the shopping interface 200 may automatically be given access to available network functions as they are configured on the device.

As previously discussed, the shopping interface 200 may be configured to transfer at least a portion of transaction, device, user, network, security, and payment-related information from the mobile device 802 via the wireless network hub 808 to a backend transaction processing system 810 in a communication network. The mobile transactions server 810 as described herein may facilitate conducting secure personalized transactions in the wireless network via a plurality of distinct trust models that may include single trust domain models, single trust cluster models, multiple trust cluster models, direct trust relationship, and the like. The mobile transaction server 810, authenticates the transactions, and sends authorization codes back to the point-of-sale system. The mobile transactions server 810 may receive any payment related information from the multi-panel shopping interface 200 through the wireless network for effecting a mobile transaction. For example, the mobile transaction server 810 may receive payment related information as part of a payment related function activated by an icon of the multi-panel shopping interface 200. The user may activate an icon such as by providing a single tap on the active icon or by providing a single touch or click on the active icon. On tapping or selection of the at least one icon of a particular collapsed panel, a shopping related transaction corresponding to the selected icon may be performed without expanding the particular collapsed panel. That is to say, the particular panel of the collapsed panel may remain collapsed and the shopping related transaction may be performed in the background of a mobile device operating system.

Once a user's mobile device is configured to access the retail environment wireless network, as the user moves within the retail environment 800, the user may be notified of offers, purchase opportunities, confirmation of prior purchases (e.g. NFC purchases, and the like), confirmation of returns, and the like without being required to be within NFC range of an NFC terminal such as NFC POS terminal 804. Such offers and notifications may be accessible via an active content item available on one of the collapsed panels. In an example, one of the active content items may be configured to activate a function to send and receive coupons and the like as touch point messages from the wireless network hub 808 while the respective collapsed panel remains collapsed. In particular, one of the collapsed panels may include an active content item for allowing the mobile device user to view coupons and the like as touch point messages while its respective collapsed panel remains collapsed.

In addition to offer management and the like, wireless network authentication as described herein (e.g. via a NFC tap interaction) may further facilitate wireless transfer of diverse formatted content to/from the mobile device 802. The content provided over the wireless network hub 808 may include, for example, but not limited to, a URL, a video, an audio message, a receipt or acknowledgement message, transaction data, store information, comparative shopping information, discounts, and the like. The mobile device 802 may also receive offers such as offers related to the user purchase history or the like over the wireless network hub 808.

To facilitate diverse content transfer, the mobile device user may be connect to the retail environment wireless network via a tap-and-pair action with the NFC POS terminal 804 upon entering the retail environment 800. The NFC POS terminal 804 may facilitate connecting the user's mobile device 802 to the wireless network hub 808, which may be connected to the mobile transactions server 810. This establishes a logical connection between the user mobile device, the wireless network hub 808 and the mobile transactions server 810. One or more of the active content items described herein in association with the shopping interface 200 may facilitate establishing and coordinating these connections while respective collapsed panels may remain collapsed.

After establishing a connection, the user may want to search for products and/or services. The multi-panel shopping interface 200 may include a search icon disposed in one of the collapsed panels. A selection of the search icon may activate searching related functions while the collapsed panel displaying the search icons may remain collapsed. For example, the active content item 204a can be defined as the search icon and may initiate a product search as desired by the user. The selected item may be added to a virtual user cart for processing product payment and the user may then add the selected item in real time to a real cart. An active content item on a collapsed panel of the shopping interface 200 may be activated by the user to scan the item's product code (e.g. bar code) on the product when adding it to a real cart to confirm the user's desire to complete a purchase transaction for the item. The virtual cart may be configured to be displayed as an active content item over one of the collapsed panels. To facilitate a seamless shopping/offer/redemption process, the multi-panel shopping interface 200 can be configured so that any discounts, deals or coupons may be automatically applied to the selected product as the product enters the virtual cart. Alternatively, the mobile device user may be presented with an option to tap-and-select another active content item for applying various coupons and the like while respective collapsed panels may remain collapsed. Presenting the user with such an option may include displaying an icon on a collapsed panel in response to determination that the offer/coupon is relevant to the item being added to the virtual cart. Such an icon may be presented in such a way as to raise visibility of the icon (e.g. color change/differentiation, size change/differentiation, dynamically changing icon, such as a video, and the like). Also, such an icon may be presented temporarily to the user so that a user's shopping interface does not become cluttered with offer icons. On selection of the product, the mobile device 802 may be configured to coordinate with the wireless network hub 808 and the mobile transactions server 810 and send all product information to the mobile transactions server 810 for payment processing.

The multi-panel shopping interface 200 may be configured to ask the mobile device user for confirmation before adding a product to the virtual cart and before sending selected product information to the mobile transactions server 810. Such a confirmation request may be presented as an icon displayed on a collapsed panel of the shopping interface 200. Such an icon may be presented in such a way as to raise visibility of the icon (e.g. color change/differentiation, size change/differentiation, dynamically changing icon, such as a video, and the like). Also, such an icon may be presented temporarily to the user so that a user's shopping interface does not become cluttered with offer icons. Upon user activation of the confirmation icon, the confirmation may be sent to the wireless network hub 808 while the respective collapsed panel may remains collapsed. In addition, the confirmation icon may be automatically removed from the collapsed panel after confirmation is accepted.

Figure 9:
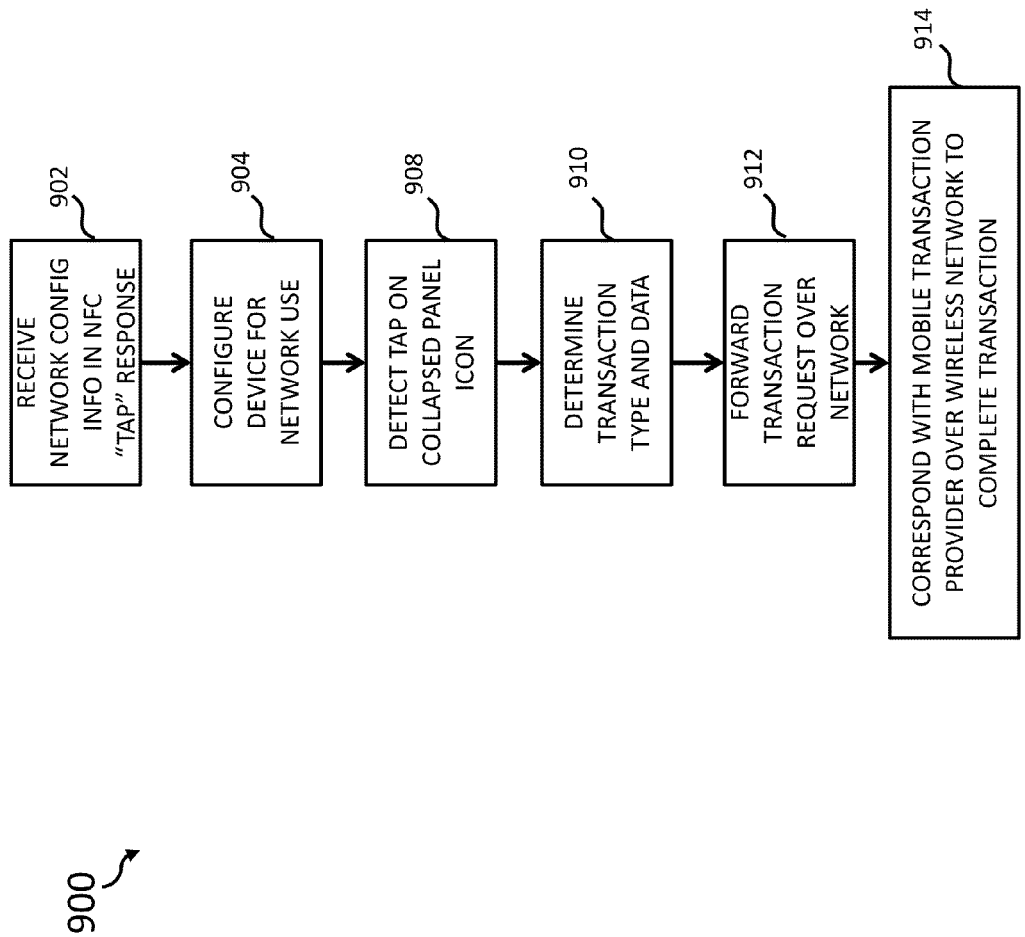
FIG. 9 depicts a flow chart for performing a shopping-related function in the environment depicted in FIG. 8.

FIG. 9 is a flow diagram of a method 900 for performing an electronic transaction that may be facilitated by the NFC function of the mobile device 802 as explained in FIG. 8 using the one or more active content items such as the icons 204a, 204b, 208a, 208b and 210a of the collapsed panels 204, 208, and 210 of the multi-panel shopping interface 200. At step 902, the mobile device 802 may receive network configuration information to connect to the wireless network hub 808. In an example, the network configuration information may be received in response to a NFC communication between the NFC function of the mobile device 802 and the NFC POS terminal 804 of the retail environment 800. As a result of a conventional NFC-style "tap" of the mobile device 802 with the NFC POS terminal 804, the terminal 804 may perform an ID exchange handshake with the mobile device 802. The handshake may include receiving device ID and optionally user ID information from the device 104 and optionally providing wireless network ID and/or authentication token information to the mobile device 802.1. If the mobile device 802 has recently been authorized to access the wireless network, steps 902 and 904 may be optionally shipped since the wireless network may automatically identify and authenticate previously authenticated/known devices that come into wireless communication proximity without requiring an NFC tap operation. In an aspect, the NFC POS terminal 804 may use P-P (peer-to-peer) protocols to exchange network and device information during the NFC transaction. Other NFC protocols that support two-way data exchange may also be used.

At step 904, the mobile device 802 may be configured to connect with the wireless network hub 808 using the network configuration information. Additionally, on completion of the NFC tap information exchange, the device 802 may communicate with the wireless network hub 808 to complete authentication and enable the mobile device 802 to use the wireless network. This may use any known or contemplated authentication scheme including without limitation having the device 802 send an authentication token received from the NFC terminal over the wireless network for authentication. The NFC tap-and-pair operation may cause the mobile device 802 to be configured to use a set of credentials to authenticate with the wireless network hub 808 to perform an electronic transaction and vice versa. As noted above, step 904 may be optional if the device has previously been authenticated on the wireless network.

At step 908, a tap on an icon of the collapsed panel may be detected. This "tap" may lead to the mobile device performing the shopping-related function associated with the tapped icon while the respective collapsed panel remains closed. The multi-panel shopping interface 200 may be configured to detect the type of active content associated with the tapped icon and accordingly may perform the shopping related functions as desired by the user over the wireless network hub 808. For example, the user may select the active content item associated with the scan icon 204a to scan a product and accordingly the product may be searched using the wireless network hub 808 without expanding the collapsed panel 204.

At step 910, the type of an electronic transaction and data pertinent to the transaction may be determined to perform the one or more shopping related functions associated with the tapped icon. Accordingly, in response to selection of an active content item, a type of transaction associated with the selected active content item and related information required to perform the transaction may be determined. For example, if a type of transaction associated with the selected active content item is a debit transaction to purchase an item, an amount of debit, debit account information, and account authentication information may be to facilitate purchasing the shopping item. The method 900 may allow determination of the authentication and account credentials of the user so as to perform the transaction. Determining authentication and account credentials may require user interaction, so an additional icon may be presented to the user in the corresponding collapsed panel to facilitate such user interaction. Likewise, an active content icon may dynamically change shape, color, size, content, and the like to signal to the user that user input is required to complete the authentication. Active content items associated with a collapsed panel of the shopping interface 200 may also facilitate performing shopping related functions using a plurality of payment cards (e.g., credit, debit, loyalty, and discounted cards), a plurality of modes of banking transactions (e.g., internet banking, mobile banking, phone banking, third party money transfer, foreign currency money payment, third party money transfer and the like), and other similar types of financial transaction modes. Accordingly, the method 900 may include determining a specific type of the transaction and information required to perform any of these transactions. Such transactions may be performed in association with or via a mobile wallet capability of the mobile device as described herein and elsewhere.

At step 912, the transaction request and all related data pertinent to the transaction may be forwarded to the mobile transaction server 810 using the wireless network hub 808. Forwarding such request and data may be performed via the mobile device's NFC technology for fast electronic payment information transfer through the NFC POS terminal 804. To facilitate a convenient shopping experience, the transaction may be completed after the user has moved away from the NFC terminal and latent delivery of payment confirmation (e.g. a payment receipt) may be provided via the wireless network.

At step 914, the device 802 may correspond with the mobile transaction server 810 over the wireless network to complete the electronic transaction. The present methods and systems may facilitate completion of the shopping related transaction using the wireless network hub 808 and on selection of the active content item corresponding to a specific collapsed panel such that the collapsed panel may remain in the collapsed state until the acceptance of the transaction.

Figure 10:
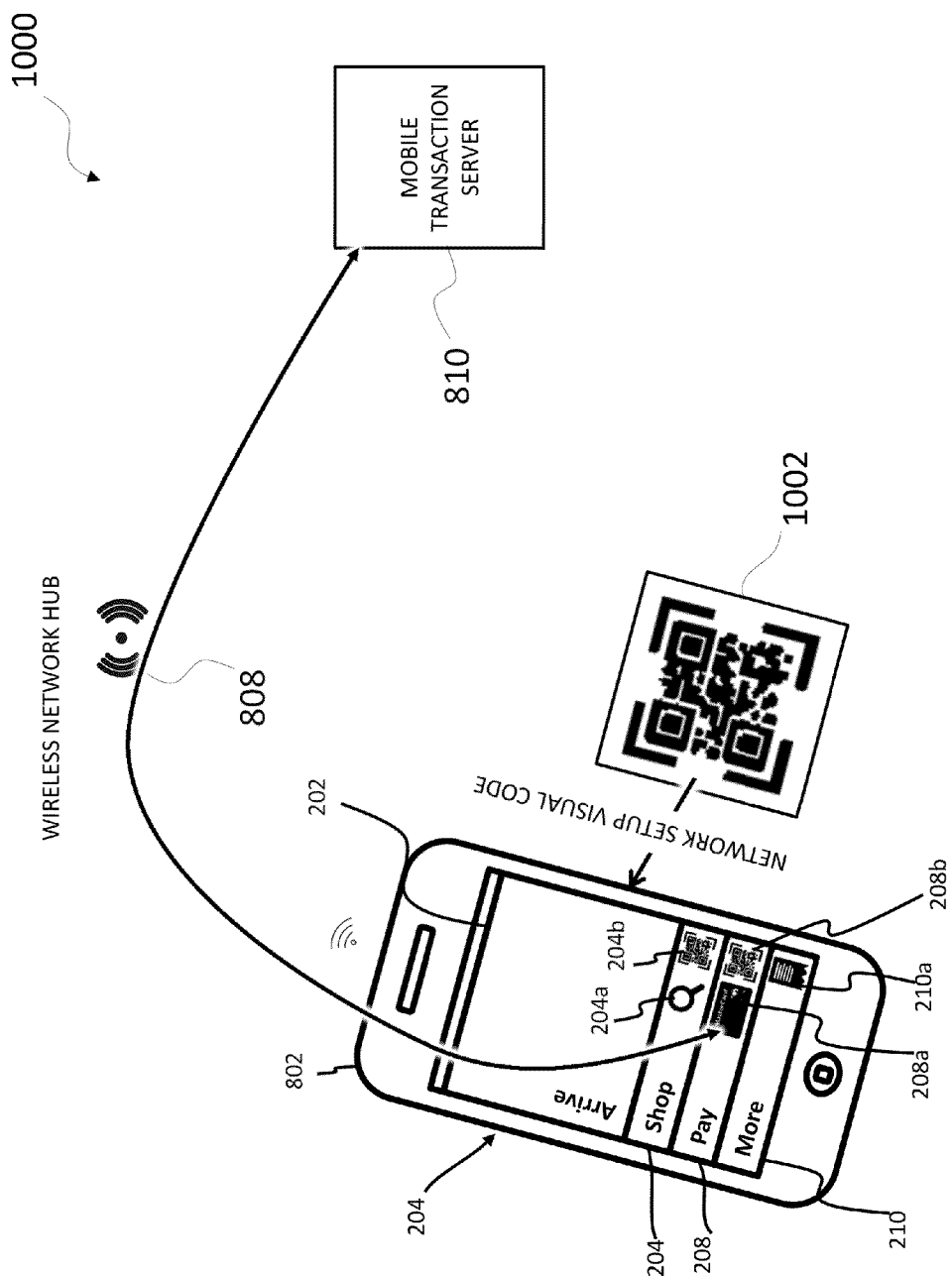
FIG. 10 depicts an environment for performing shopping transactions via a multi-panel user interface of a mobile phone over a wireless network to which access has been obtained via visual code scan.

FIG. 10 depicts a retail environment 1000 in which the mobile device (such as a mobile device 802) is configured to use a visual code 1002 to connect with the wireless network hub 808. To facilitate such network access, the mobile device 802 may be configured to acquire the visual code 1002 that may grant access to the wireless network hub 808 by a user selecting an active content item, such as an icon disposed on any of the collapsed panels of the multi-panel shopping interface 200. The selection of such an icon may in turn activate a function that captures the visual code 1002 and uses it to gain access to the wireless network hub 808 while the collapsed panels may remain in the collapsed state. The user of the mobile device 802 may be provided the visual code 1002 by a retail store operator, an owner, or any other authority for accessing the wireless network hub 808. The visual code 1002 may include but is not limited to a linear or 1-D barcodes (e.g., UPC) and 2-D barcodes (e.g., Datamatrix, QR codes, PDF 417, and Semacode) and other similar codes.

On selecting an active content item for visual code-based network authentication, the mobile device 802 may be configured to activate its camera function for capturing image data associated with the visual code 1002. The mobile device 802 may be also configured to scan the visual code 1002 (e.g. decode the image data). The mobile device 802 may further be configured with required hardware and software capable of scanning (and/or reading) the visual code 1002. For example, the mobile device 802 may include a barcode reader capability having decoder logic configured to analyze image data of the visual code 1002. A scan of the visual code 1002 may provide network configuration information to the mobile device 802 because the visual code 1002 may store the network configuration information. Network configuration information may include a service set identifier (SSID) number and password required to connect to the wireless network hub 808. In one aspect, configuring the mobile device 802 using the network configuration information may include sending at least a portion of the network configuration information to the mobile device 802 via a network service provider of the mobile device 802.

The mobile device 802 may utilize a wireless communication technology, such as Bluetooth technology, Wi-Fi technology, WIMAX, WiBro and the other similar wireless technologies in communication with the wireless network hub

808. The wireless communication technology may enable the mobile device 802 to wirelessly communicate in the retail environment 1000 to facilitate a wide range of touch point opportunities associated with a purchase or an electronic transaction. For example, when a consumer moves within the retail environment 1000 with the paired mobile device 802, the user may be notified of offers, purchase opportunities, confirmation of prior NFC purchases, confirmation of Bluetooth purchases, confirmation of Wi-Fi purchases and the like without being required to be within the wireless range of the POS terminal which may not provide a wider range. The wireless communication technology may enhance the range of wireless communication and thereby, may allow the mobile device user (e.g. a consumer) to move or walk while performing electronic transactions, and the like in the retail environment 1000.

Once the mobile device 802 gains access for the wireless network hub 808, the user may use the multi-panel shopping interface 200 to perform one or more shopping related functions via active content items disposed on one or more of the collapsed panels. A mobile device may perform one or more shopping related functions by communicating over the wireless network with the mobile transaction server 810.

Figure 11:
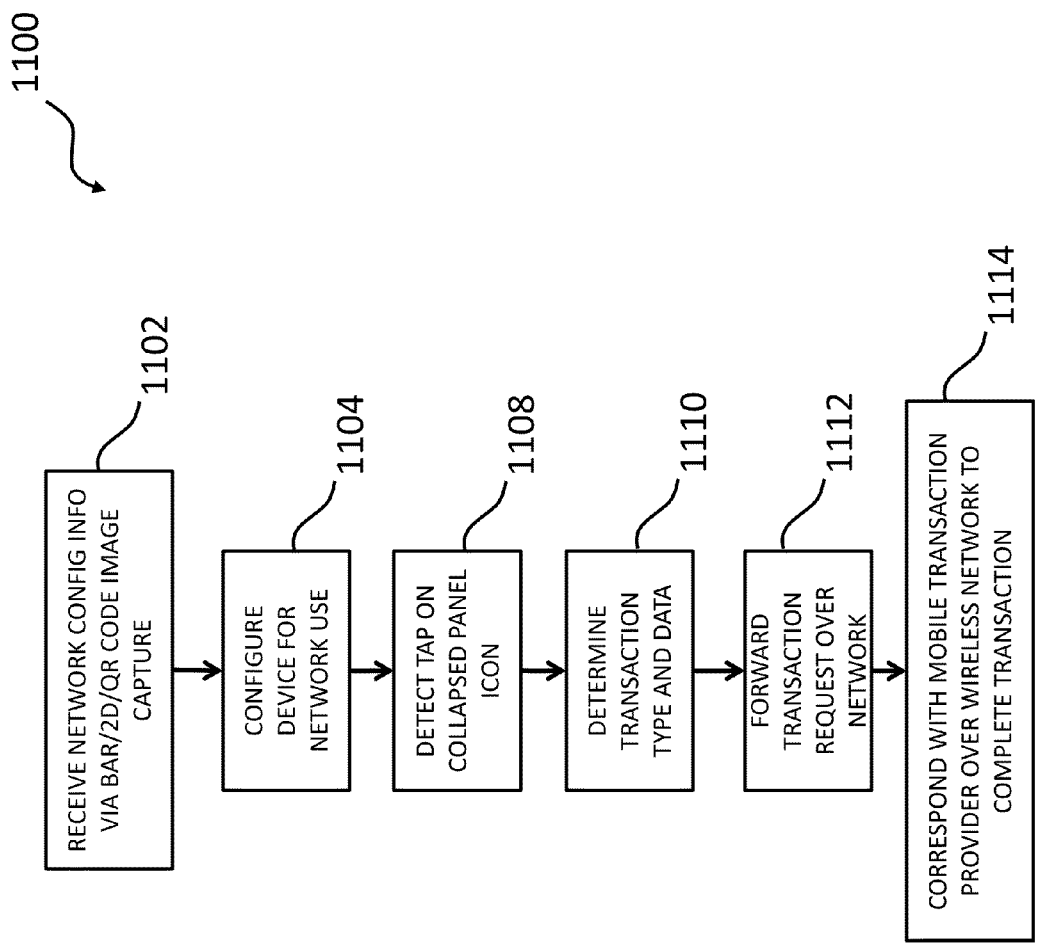
FIG. 11 depicts a flow chart for performing a shopping-related function in the environment depicted in FIG. 10.

FIG. 11 depicts an exemplary method 1100 for performing an electronic transaction via a wireless network that may be accessed using a visual code scan-and-pair action performed by the mobile device 802. At step 1102, the mobile device 802 may receive network configuration information by capturing image data of a visual code. For example, the user may use a camera function of the mobile device for capturing image data of the visual code 1002 of FIG. 10. The mobile device 802 may further scan (read) the visual code 1002 for retrieving network configuration information stored in the visual code 1002. The network configuration information may facilitate coupling of the mobile device 802 with the mobile transaction server 810 over the wireless network hub 808. The wireless network hub 808 and the mobile transaction server 810 may enable the multi-panel based user shopping interface 200 of the mobile device 802 to wirelessly communicate in the retail environment.

At step 1104, the mobile device 802 may be configured for being used in the wireless network on the basis of the network configuration received in the captured visual scan code step 1102. In an example, configuring the mobile device 802 using the network configuration information may include sending at least a portion of the network configuration information to the mobile device 802 via the wireless network.

At step 1108, a tap on an icon of the collapsed panel may be detected. The "tap" may lead to an activation of one or more active content items such as the icons 204*a*, 204*b*, 208*a*, 208*b* and 210*a* while the respective collapsed panels may remain closed during the tapping action.

At step 1110, the type of an electronic transaction and data pertinent to the transaction may be determined to perform the one or more shopping related functions. For example, the user may select the active content item associated with the icon 208*a* of the collapsed panel 208. Accordingly, the method may include determining the type of transaction associated with the active content item of the icon 208*a* and related information required to perform the transaction.

At step 1112, the transaction request and all related data may be forwarded to the mobile transaction server 810 using the wireless network hub 808.

At step 1114, the device 802 may correspond with the mobile transaction server 810 over the wireless network to complete the electronic transaction.

Figure 12:
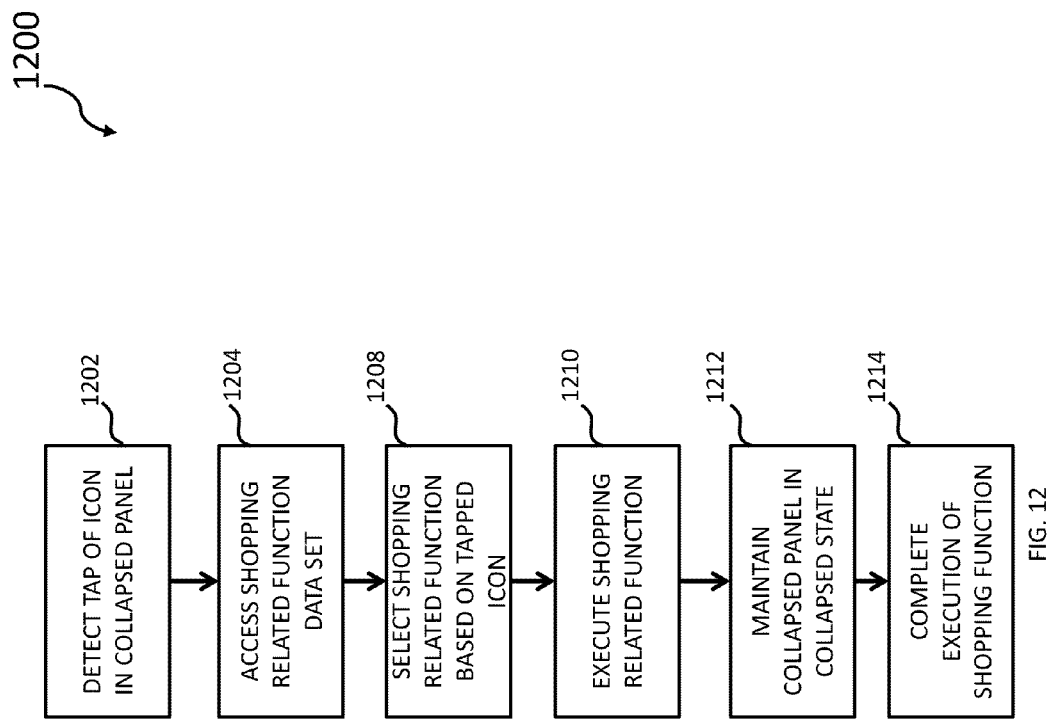
FIG. 12 depicts a flow chart of operation of a multi-plane user interface.

Referring to FIG. 12 that depicts an algorithm for shopping-related function selection and execution 1200 based on a user selected icon disposed in a collapsed panel of a multi-panel user interface, a shopping-related function may be determined by comparing a selected icon to a table of icon entries that facilitates cross referencing disposed icons with shopping-related functions.

At step 1202, a shopping-related function interface executing on a mobile device may detect or be informed of a tap or other user selection of an icon that is disposed on a collapsed panel of a multi-panel user interface. Information that identifies the icon and the panel may be provided to the shopping-related function interface to facilitate selecting a shopping-related function.

At step 1204, a shopping-related function data set, such as a cross-reference table may be accessed to gather up possible icons, panels, and shopping-related functions.

At step 1208, the selected icon information is used by the shopping-related function interface facility to select a shopping related function from the cross-reference table. In an example, the user may have selected a magnifying icon in a shop panel. This information may be used to identify a shopping-related function in the cross-reference table.

At step 1210, the mobile device executes the selected shopping related function while the panel on which the selected icon is disposed remains collapsed as noted in step 1212.

At step 1214, the shopping-related function execution is completed while the collapsed panel remains collapsed.

Referring to FIG. 13 that depicts a cross-reference table of panels, icons, and shopping functions, each panel-icon combination may indicate a particular shopping function, collapsed panel state, and meta data. This cross-reference table may be used by software executing on the mobile device to determine a shopping-related function to be performed based on which icon is selected on which collapsed panel. This table may further facilitate determining what state the collapsed panel should transition to based on the user selection of an icon. Meta data associated with a panel-icon combination may facilitate performing the shopping-related function by providing or indicating additional information needed for the function. In an example, the combination of a shop panel with a magnifying glass icon indicates a search function is to be performed and meta data that may be suitable for performing the shopping related function may include user preferences, such as an order of search results, and the like.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SAAS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, net books, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

We claim:

1. A method of accessing one of a plurality of shopping related functions via a multi-panel user interface, the method comprising:
    displaying a single expanded panel of a multi-panel user shopping interface on an electronic display of a computing device;
    displaying a plurality of collapsed panels of the multi-panel user shopping interface on the electronic display, wherein at least one of the plurality of collapsed panels includes an icon to facilitate performing a shopping-related function; and
    receiving an indication of a user selection of the icon and in response thereto:
        determining with the computing device a shopping-related function from the plurality of shopping-related functions based on an association of the icon and the shopping-related function; and
        causing execution of program steps by the computing device that perform the determined shopping-related function while permitting the collapsed panel that includes the icon to remain collapsed.

2. The method of claim 1, further including permitting the single expanded panel to remain expanded and the plurality of collapsed panels to remain collapsed during the execution of the program steps.

3. The method of claim 1, wherein the indication of a user selection of the icon comprises an indication that the user selected the icon by single-tapping the icon in a touch sensitive electronic display.

4. The method of claim 3, wherein the at least one of the plurality of collapsed panels includes a plurality of icons to facilitate accessing different shopping-related functions without requiring expansion of the collapsed panel.

5. The method of claim 1, wherein the program steps are adapted to cause a display generated by the shopping-related function to supplant a portion of the multi-panel user shopping interface on the electronic display.

6. The method of claim 5, wherein the supplanted portion is the single expanded panel.

7. The method of claim 5, wherein the supplanted portion comprises the single expanded panel and a portion of the plurality of collapsed panels.

8. The method of claim 5, wherein the supplanted portion comprises the single expanded panel and all of the plurality of collapsed panels.

9. The method of claim 1, wherein the computing device is a mobile user device.

10. The method of claim 1, wherein the user shopping interface further comprises an icon disposed on the single expanded panel for accessing a shopping-related function.

11. The method of claim 1, wherein at least two of the plurality of collapsed panels include at least one icon for facilitating one-tap access to distinct shopping-related functions.

12. The method of claim 1, wherein the plurality of shopping-related functions includes one or more of accessing vouchers, accessing shopping lists, performing payments, presenting loyalty cards, and redeeming coupons.

13. The method of claim 1, wherein determining a shopping-related function includes using data associated with the icon to access a dataset of shopping-related functions.

14. The method of claim 1, wherein the shopping-related function comprises:
    activating a camera function of the computing device without requiring the collapsed panel to be expanded;
    presenting an image of a field of view of the camera in a portion of the electronic display;
    analyzing with the computing device the image to determine a data value associated with a visual code detected in the image;
    transmitting at least the data value over a network to a server;
    receiving from the server in response a purchase price for a purchasable product associated with the determined data value; and
    presenting at least the purchase price of the purchasable product in the portion of the electronic display.

15. The method of claim 14, further comprising adding the purchasable product to a virtual shopping cart without requiring the collapsed panel to expand.

16. The method of claim 1, wherein execution of the program steps comprises:
    forwarding an action type associated with the shopping-related function to a mobile transaction processing platform that communicates via an application programming interface layer with a wallet access widget to access select mobile wallet payment resources of the mobile device; and
    performing the shopping-related function via the mobile transaction processing platform with a specific mobile wallet payment resource that is based on the action type.

17. The method of claim 16, wherein performing the shopping-related function includes executing a wallet companion applet on the mobile device for accessing the payment resource of the mobile wallet.

18. The method of claim 1, wherein determining a shopping-related function comprises accessing a data table that cross-references icons with shopping-related functions.

19. A personal mobile electronic device comprising a display on which a user shopping interface configured to provide access to a plurality of shopping related functions is presented, wherein the user shopping interface comprises one or more collapsed panels; and
    a portion of the one or more collapsed panels including one or more icons that are configured to cause the mobile electronic device to perform program steps that provide access to a portion of the plurality of shopping related functions in response to selection of the one or more icons without requiring expanding any of the one or more collapsed panels.

\* \* \* \* \*

UNITED STATES PATENT AND TRADEMARK OFFICE
CERTIFICATE OF CORRECTION

PATENT NO. : 9,064,281 B2  Page 1 of 1
APPLICATION NO. : 13/776388
DATED : June 23, 2015
INVENTOR(S) : Barbara Elaine Ballard et al.

It is certified that error appears in the above-identified patent and that said Letters Patent is hereby corrected as shown below:

Specification

In column 25, line 2, delete "802.1." and insert -- 802. --, therefor.

Signed and Sealed this
Twenty-fourth Day of November, 2015

Michelle K. Lee
*Director of the United States Patent and Trademark Office*